US008666702B2

(12) United States Patent
Schell

(10) Patent No.: US 8,666,702 B2
(45) Date of Patent: Mar. 4, 2014

(54) METHOD AND APPARATUS FOR GENERATING DESIGN DRAWINGS

(75) Inventor: Gerhard Schell, Gondelsheim (DE)

(73) Assignee: SEW Eurodrive GmbH & Co. KG, Bruchsal (DE)

( * ) Notice: Subject to any disclaimer, the term of this patent is extended or adjusted under 35 U.S.C. 154(b) by 1081 days.

(21) Appl. No.: 12/027,080

(22) Filed: Feb. 6, 2008

(65) Prior Publication Data

US 2008/0189083 A1    Aug. 7, 2008

Related U.S. Application Data

(60) Provisional application No. 60/956,044, filed on Aug. 15, 2007.

(30) Foreign Application Priority Data

Feb. 7, 2007 (DE) .......................... 10 2007 006 808

(51) Int. Cl.
| | | |
|---|---|---|
| *G06F 17/50* | (2006.01) | |
| *G06F 19/00* | (2011.01) | |
| *G06T 17/00* | (2006.01) | |
| *G06F 9/44* | (2006.01) | |

(52) U.S. Cl.
USPC .................... 703/1; 700/97; 700/98; 345/420

(58) Field of Classification Search
USPC ............................ 703/1; 345/420; 700/97–98
See application file for complete search history.

(56) References Cited

U.S. PATENT DOCUMENTS

| 5,526,517 A | | 6/1996 | Jones et al. | |
|---|---|---|---|---|
| 5,815,154 A | * | 9/1998 | Hirschtick et al. | ............ 345/420 |
| 5,844,554 A | * | 12/1998 | Geller et al. | ................. 715/744 |

(Continued)

FOREIGN PATENT DOCUMENTS

| DE | 689 29 075 T2 | 12/1990 |
|---|---|---|
| DE | 689 29 075 | 3/2000 |
| EP | 1 087 342 A2 | 8/2000 |
| EP | 1 087 342 A2 | 3/2001 |

OTHER PUBLICATIONS

Christian J. J. Paredis, et al., "Composable Models for Simulation-Based Design", Carnegie Mellon University, Institute for Complex Engineered Systems, Department of Electrical and Computer Engineering, 2001, pp. 1-34, cite available at http://citeseer.ist.psu.edu/429339.html.

(Continued)

*Primary Examiner* — Akash Saxena
(74) *Attorney, Agent, or Firm* — Blakely, Sokoloff, Taylor & Zafman LLP

(57) ABSTRACT

A first data structure stores one or more components of a modular system, wherein each component includes a quantity of features. A second data structure stores one or more component position numbers, wherein at least one component is assignable to each of the one or more component position numbers, and each design variant is describable by assignment of the components of the modular system to component position numbers of the second data structure. A third data structure stores one or more rules, wherein each rule is to set at least two component position numbers in a relationship, and an assembly module in a computing device is to select the rules from the third data structure that correspond to the one or more component position numbers, and to cause a design drawing to be displayed according to the selected rules.

43 Claims, 21 Drawing Sheets

(56) References Cited

U.S. PATENT DOCUMENTS

| | | | |
|---|---|---|---|
| 6,810,401 B1* | 10/2004 | Thompson et al. | 700/97 |
| 6,906,712 B2* | 6/2005 | Lee et al. | 345/420 |
| 7,313,504 B2* | 12/2007 | Chin et al. | 703/1 |
| 7,461,049 B2* | 12/2008 | Thompson et al. | 707/999.1 |
| 8,433,432 B2* | 4/2013 | Matsushita et al. | 700/98 |
| 2001/0047312 A1* | 11/2001 | Verchere | 705/26 |
| 2002/0073001 A1* | 6/2002 | Palmer et al. | 705/29 |
| 2002/0133433 A1* | 9/2002 | Hall | 705/27 |
| 2002/0133802 A1* | 9/2002 | Spradlin et al. | 717/104 |
| 2002/0156698 A1 | 10/2002 | Machau et al. | |
| 2003/0204823 A1* | 10/2003 | Armstrong et al. | 716/2 |
| 2004/0140976 A1* | 7/2004 | Callahan | 345/419 |
| 2006/0020629 A1* | 1/2006 | Ramani et al. | 707/104.1 |
| 2006/0277010 A1* | 12/2006 | Schutte et al. | 703/8 |
| 2010/0066731 A1* | 3/2010 | Vecore et al. | 345/419 |

OTHER PUBLICATIONS

Paredis, Christian J.J., et al, "Composite Models for Simulation-Based Design," Carnegie Mellon University, Institute for Complex Engineered Systems, Department of Electrical and Computer Engineering, pp. 1-34.

Office Action for counterpart application in Europe, Application No. 12 001 487.3-2224, dated Dec. 3, 2012, 7 pages.

PCT International Search Report for PCT/US2008/001619, mailed Aug. 27, 2008, 3 pages.

PCT Written Opinion of the International Searching Authority for PCT/US2008/001619, mailed Aug. 27, 2008, 7 pages.

PCT International Preliminary Report on Patentability for PCT/US2008/001619, mailed Aug. 11, 2009, 8 pages.

* cited by examiner

| POSITION | PRODUCT POSITION NUMBER | ITEM NUMBER | QUANTITY | CAD PART | PART SUBJECT TO WEAR | COMPONENT TYPE |
|---|---|---|---|---|---|---|
| 1 | HOU | 010 | 1 | 1 | 0 | 1 |
| 2 | FLA1 | 041 | 1 | 1 | 0 | 1 |
| 3 | FLA2 | 040 | 1 | 1 | 0 | 1 |
| 4 | FLA3 | 041 | 1 | 1 | 0 | 1 |
| 5 | FLA4 | 040 | 1 | 1 | 0 | 1 |
| 6 | SCR1 | 050 | 6 | 1 | 0 | 1 |
| 7 | SCR2 | 050 | 6 | 1 | 0 | 1 |
| 8 | SCR3 | 050 | 6 | 1 | 0 | 1 |
| 9 | SCR4 | 050 | 6 | 1 | 0 | 1 |
| 10 | BEAR1 | 020 | 1 | 1 | 1 | 1 |
| 11 | BEAR2 | 020 | 1 | 1 | 1 | 1 |
| 12 | BEAR3 | 020 | 1 | 1 | 1 | 1 |
| 13 | BEAR4 | 020 | 6 | 1 | 1 | 1 |
| 14 | SHA1 | 030 | 6 | 1 | 0 | 1 |
| 15 | SHA2 | 030 | 6 | 1 | 0 | 1 |
| 16 | GW1 | 060 | 6 | 1 | 0 | 1 |
| 17 | GW2 | 060 | 1 | 1 | 0 | 1 |
| 18 | COV | 070 | 1 | 1 | 0 | 2 |
| 19 | EYE | 080 | 1 | 0 | 0 | 0 |
| 20 | SEAL | 075 | 1 | 0 | 1 | 0 |
| 21 | MAN | MANEN | 1 | 0 | 0 | 0 |
| 22 | LUB | OIL1 | 1 | 0 | 1 | 0 |

FIG. 2A

PURCHASE ORDER PARTS LIST
102

| COMPONENT POSITION NUMBER | | DESCRIPTION |
|---|---|---|
| 1 | HOU | HOUSING |
| 2 | COV | COVER FOR HOUSING |
| 3 | FLA0 | FLANGE FOR SHAFT OPENING AT SP (SHAFT POSITION) 0 |
| 4 | FLA1 | FLANGE FOR SHAFT OPENING AT SPI |
| 5 | FLA2 | FLANGE FOR SHAFT OPENING AT SP2 |
| 6 | FLA3 | FLANGE FOR SHAFT OPENING AT SP3 |
| 7 | FLA4 | FLANGE FOR SHAFT OPENING AT SP3 |
| 8 | BEAR0 | BEARING FOR FLA0 |
| 9 | BEAR1 | BEARING FOR FLA1 |
| 10 | BEAR2 | BEARING FOR FLA2 |
| 11 | BEAR3 | BEARING FOR FLA3 |
| 12 | BEAR4 | BEARING FOR FLA4 |
| 13 | SHA0 | SHAFT FOR SP0 |
| 14 | SHA1 | SHAFT FOR SP1-SP2 |
| 15 | SHA2 | SHAFT FOR SP3-SP4 |
| 16 | SCR0 | SCREWS FOR FLA0 |
| 17 | SCR1 | SCREWS FOR FLA1 |
| 18 | SCR2 | SCREWS FOR FLA2 |
| 19 | SCR3 | SCREWS FOR FLA3 |
| 20 | SCR4 | SCREWS FOR FLA4 |
| 21 | GW0 | GEAR WHEEL FOR SHA0 |
| 22 | GW1 | GEAR WHEEL FOR SHA1 |
| 23 | GW2 | GEAR WHEEL FOR SHA2 |
| 24 | EYE | EYELETS FOR COV |
| 25 | ODPC | OIL DRAIN PLUG FOR COV |
| 26 | ODPH | OIL SENSOR FOR HOU |
| 27 | SEN | SEAL FOR COV |
| 28 | SEAL | OPERATING MANUAL |
| 29 | MAN | OPERATING MANUAL |
| 30 | LUB | LUBRICANT |

FIG. 3

COMPONENT POSITION NUMBER CATALOG 300

| ID | SN1 | SN2 | SP | CONFIG | ALIGNMENT | LINKAGE |
|---|---|---|---|---|---|---|
| 96 | FLA1 | HOU | 24 | STANDARD | COMPULSORY | COAXIAL |
| 97 | FLA1 | HOU | 24 | STANDARD | COMPULSORY | COAXIAL, CONGRUENT, COUNTER-ALIGNED |
| 98 | FLA1 | HOU | 24 | STANDARD | COMPULSORY | COAXIAL |
| 99 | FLA2 | HOU | 24 | STANDARD | COMPULSORY | COAXIAL |
| 100 | FLA2 | HOU | 24 | STANDARD | COMPULSORY | COAXIAL |
| 101 | FLA2 | HOU | 24 | STANDARD | COMPULSORY | COAXIAL, CONGRUENT, COUNTER-ALIGNED |
| 102 | FLA3 | HOU | 24 | STANDARD | COMPULSORY | COAXIAL |
| 103 | FLA3 | HOU | 24 | STANDARD | COMPULSORY | COAXIAL, CONGRUENT, COUNTER-ALIGNED |
| 104 | FLA3 | HOU | 24 | STANDARD | COMPULSORY | COAXIAL |
| 105 | FLA4 | HOU | 24 | STANDARD | COMPULSORY | COAXIAL |
| 106 | FLA4 | HOU | 24 | STANDARD | COMPULSORY | COAXIAL |
| 107 | FLA4 | HOU | 24 | STANDARD | COMPULSORY | COAXIAL, CONGRUENT, COUNTER-ALIGNED |
| 108 | SCR1 | FLA1 | 0 | STANDARD | COMPULSORY | COAXIAL |
| 109 | SCR1 | FLA1 | 0 | STANDARD | COMPULSORY | PATTERN FEATURE |
| 110 | SCR1 | FLA1 | 0 | STANDARD | COMPULSORY | COAXIAL, CONGRUENT, COUNTER-ALIGNED |
| 111 | SCR2 | FLA2 | 0 | STANDARD | COMPULSORY | COAXIAL |
| 112 | SCR2 | FLA2 | 0 | STANDARD | COMPULSORY | PATTERN FEATURE |
| 113 | SCR2 | FLA2 | 0 | STANDARD | COMPULSORY | COAXIAL, CONGRUENT, COUNTER-ALIGNED |
| 114 | SCR3 | FLA3 | 0 | STANDARD | COMPULSORY | COAXIAL |
| 115 | SCR3 | FLA3 | 0 | STANDARD | COMPULSORY | PATTERN FEATURE |
| 116 | SCR3 | FLA3 | 0 | STANDARD | COMPULSORY | COAXIAL, CONGRUENT, COUNTER-ALIGNED |
| 117 | SCR4 | FLA4 | 0 | STANDARD | COMPULSORY | COAXIAL |
| 118 | SCR4 | FLA4 | 0 | STANDARD | COMPULSORY | PATTERN FEATURE |
| 119 | SCR4 | FLA4 | 0 | STANDARD | COMPULSORY | COAXIAL, CONGRUENT, COUNTER-ALIGNED |
| 120 | BEAR1 | FLA1 | 0 | STANDARD | COMPULSORY | COAXIAL, CONGRUENT, COUNTER-ALIGNED |

FIG. 4A

| DESIGNATION1 | DESIGNATION2 | REMARKS | ACTIVE |
|---|---|---|---|
| S_CF_1 | S_CF_POS1 | | TRUE |
| S_PF_1 | S_PF_POS2 | | TRUE |
| S_CF_3 | S_CF_POS1 | | TRUE |
| S_CF_1 | S_CF_POS2 | | TRUE |
| S_CF_3 | S_CF_POS2 | | TRUE |
| S_PF_1 | S_PF_POS2 | | TRUE |
| S_CF_3 | S_CF_POS3 | | TRUE |
| S_PF_1 | S_PF_POS3 | | TRUE |
| S_CF_1 | S_CF_POS3 | | TRUE |
| S_CF_1 | S_CF_POS4 | | TRUE |
| S_CF_3 | S_CF_POS4 | | TRUE |
| S_PF_1 | S_PF_POS3 | | TRUE |
| S_CF_1 | S_CF_3 | | TRUE |
| – | SCR-CONNECTION PATTERN | | TRUE |
| S_PF_1 | S_PF_3 | | TRUE |
| S_CF_1 | S_CF_3 | | TRUE |
| – | SCR-CONNECTION PATTERN | | TRUE |
| S_PF_1 | S_PF_3 | | TRUE |
| S_CF_1 | S_CF_3 | | TRUE |
| – | SCR-CONNECTION PATTERN | | TRUE |
| S_PF_1 | S_PF_3 | | TRUE |
| S_CF_1 | S_CF_3 | | TRUE |
| – | SCR-CONNECTION PATTERN | | TRUE |
| S_PF_1 | S_PF_3 | | TRUE |
| S_PF_1 | S_PF_2 | | TRUE |

KNOWLEDGE BASE
DATA STRUCTURE
103

FIG. 4A (CONTINUED)

| ID | SN1 | SN2 | SP | CONFIG | ALIGNMENT | LINKAGE |
|---|---|---|---|---|---|---|
| 121 | BEAR2 | FLA2 | 0 | STANDARD | COMPULSORY | CONGRUENT, COUNTER-ALIGNED |
| 122 | BEAR3 | FLA3 | 0 | STANDARD | COMPULSORY | CONGRUENT, COUNTER-ALIGNED |
| 123 | BEAR4 | FLA4 | 0 | STANDARD | COMPULSORY | CONGRUENT, COUNTER-ALIGNED |
| 124 | BEAR1 | HOU | 0 | STANDARD | COMPULSORY | COAXIAL |
| 125 | BEAR2 | HOU | 0 | STANDARD | COMPULSORY | COAXIAL |
| 126 | BEAR3 | HOU | 0 | STANDARD | COMPULSORY | COAXIAL |
| 127 | BEAR4 | HOU | 0 | STANDARD | COMPULSORY | COAXIAL |
| 129 | SHA1 | HOU | 0 | STANDARD | COMPULSORY | CONGRUENT, ALIGNED |
| 131 | SHA2 | HOU | 24 | STANDARD | POSITION | CONGRUENT, ALIGNED |
| 132 | SHA1 | BEAR1 | 24 | STANDARD | POSITION | CONGRUENT, COUNTER-ALIGNED |
| 133 | SHA1 | BEAR1 | 24 | STANDARD | COMPULSORY | COAXIAL |
| 134 | SHA2 | BEAR3 | 24 | STANDARD | COMPULSORY | CONGRUENT, COUNTER-ALIGNED |
| 135 | SHA2 | BEAR3 | 24 | STANDARD | COMPULSORY | COAXIAL |
| 136 | GW1 | GW1 | 24 | STANDARD | COMPULSORY | CONGRUENT, COUNTER-ALIGNED |
| 137 | GW1 | GW1 | 0 | STANDARD | COMPULSORY | COAXIAL |
| 138 | GW1 | GW1 | 0 | STANDARD | COMPULSORY | CONGRUENT, PARALLEL-ALIGNED |
| 139 | GW2 | GW2 | 0 | STANDARD | COMPULSORY | CONGRUENT, COUNTER-ALIGNED |
| 140 | GW2 | GW2 | 0 | STANDARD | COMPULSORY | COAXIAL |
| 141 | GW2 | GW2 | 0 | STANDARD | COMPULSORY | CONGRUENT, PARALLEL-ALIGNED |
| 142 | COV | HOU | 0 | STANDARD | COMPULSORY | CONGRUENT, ALIGNED |
| 143 | COV | HOU | 0 | STANDARD | COMPULSORY | CONGRUENT, NEXT |
| 144 | COV | HOU | 0 | STANDARD | COMPULSORY | CONGRUENT, NEXT |

FIG. 4B

| | | | |
|---|---|---|---|
| S_PF_1 | S_PF_2 | | TRUE |
| S_PF_1 | S_PF_2 | | TRUE |
| S_PF_1 | S_PF_2 | | TRUE |
| S_CF_1 | S_CF_POS1 | | TRUE |
| S_CF_1 | S_CF_POS2 | | TRUE |
| S_CF_1 | S_PF_POS3 | | TRUE |
| S_CF_1 | S_CF_POS4 | | TRUE |
| S_PF_POSITION | S_PF_POS3 | | TRUE |
| S_PF_POSITION | S_CF_POS2 | | TRUE |
| S_PF_1 | S_PF_2 | | TRUE |
| S_CF_1 | S_CF_2 | | TRUE |
| S_PF_1 | S_PF_2 | | TRUE |
| S_CF_1 | S_CF_2 | | TRUE |
| S_PF_1 | S_PF_GEAR WHEEL | | TRUE |
| S_CF_1 | S_CF_GEAR WHEEL | | TRUE |
| S_PF_ALIGNMENT | S_PF_GEAR WHEEL_ALIGNMENT | | TRUE |
| S_PF_1 | S_PF_GEAR WHEEL | | TRUE |
| S_CF_1 | S_CF_GEAR WHEEL | | TRUE |
| S_PF_ALIGNMENT | S_PF_GEAR WHEEL_ALIGNMENT | | TRUE |
| PLANE ABOVE | S_PF_DECKEL | | TRUE |
| PLANE RIGHT | S_PF_PLANE RIGHT | | TRUE |
| PLANE FRONT | S_CF_PLANE FRONT | | TRUE |

KNOWLEDGE BASE
DATA STRUCTURE
103

FIG. 4B (CONTINUED)

| RULE # | SERIAL #1 | SERIAL #2 | SHAFT POSITION | CONFIGURATION | ALIGNMENT | LINKAGE / PATTERN | DESIGNATION1 |
|---|---|---|---|---|---|---|---|
| 1 | 301 | 311 | 23 | STANDARD | COMPULSORY | LINKAGE_CONGRUENT | S_BEARING1 |
| 2 | 301 | 311 | 23 | STANDARD | COMPULSORY | LINKAGE_CONGRUENT | A_AXIS |
| 3 | 301 | 099 | 23 | STANDARD | POSITION | LINKAGE_CONGRUENT | SURFACE_MIRROR_LEFT |
| 4 | 301 | 099 | 23 | STANDARD | POSITION | LINKAGE_CONGRUENT | SURFACE_MIRROR_RIGHT |
| 5 | 301 | 330 | 0 | STANDARD | COMPULSORY | LINKAGE_CONGRUENT | SURFACE_GROOVE1 |
| 6 | 330 | 099 | 0 | STANDARD | POSITION | LINKAGE_CONGRUENT | SURFACE_ABOVE |
| 7 | 301 | 330 | 0 | STANDARD | COMPULSORY | LINKAGE_CONGRUENT | SURFACE_RIGHT |
| 8 | 099 | 301 | 23 | STANDARD | COMPULSORY | LINKAGE_CONGRUENT | A_AXIS3 |
| 9 | 099 | 201 | 23 | STANDARD | COMPULSORY | LINKAGE_CONGRUENT | A_AXIS2 |
| 10 | 099 | 100 | 23 | STANDARD | COMPULSORY | LINKAGE_CONGRUENT | A_AXIS1 |
| 11 | 099 | 401 | 23 | STANDARD | COMPULSORY | LINKAGE_CONGRUENT | A_AXIS4 |
| 12 | 032 | 031 | 0 | STANDARD | COMPULSORY | LINKAGE_CONGRUENT | A_AXISB1 |
| 13 | 032 | 031 | 0 | STANDARD | COMPULSORY | LINKAGE_CONGRUENT | SURFACE_ABOVE |
| 14 | 032 | 031 | 0 | STANDARD | COMPULSORY | PATTERN FEATURE | CLEARANCE HOLES FOR MOUNTING SCREWS |
| 15 | 032 | 031 | 0 | STANDARD | COMPULSORY | LINKAGE_CONGRUENT | THREAD M20 |

FIG. 9

| DESIGNATION2 | PARAM1 | PARAM2 | PARAM3 | PARAM4 |
|---|---|---|---|---|
| S_BEARING1 | | | | |
| A_AXIS | | | | |
| SURFACE_LEFT | | | | |
| SURFACE_RIGHT | | | | |
| SURFACE_BELOW | | | | |
| SURFACE_ABOVE | | | | |
| SURFACE_RIGHT | | | | |
| A_AXIS | | | | |
| A_AXIS | | | | |
| A_AXIS | | | | |
| A_AXIS | | | | |
| A_AXIS | | | | |
| SURFACE_SUPPORT | | | | |
| A_AXISB1 | | | | |
| A_AXISB2 | | | | |

FIG. 9 (CONTINUED)

| PRODUCT POSITION NUMBER | ITEM NUMBER | PRIORITY | FOUND IN KNOWLEDGE BASE AND PARTS LIST | PLM DOCUMENT FOUND | PART SUBJECT TO WEAR | 3D MODEL | C_ID | QUANTITY | LINKAGES |
|---|---|---|---|---|---|---|---|---|---|
| HOU | 010 | 0 | 0 | 0 | 0 | | | 1 | |
| FLA1 | 041 | 0 | 0 | 0 | 0 | | | 1 | |
| FLA2 | 040 | 0 | 0 | 0 | 0 | | | 1 | |
| FLA3 | 041 | 0 | 0 | 0 | 0 | | | 1 | |
| FLA4 | 040 | 0 | 0 | 0 | 0 | | | 1 | |
| SCR1 | 050 | 0 | 0 | 0 | 0 | | | 6 | |
| SCR2 | 050 | 0 | 0 | 0 | 0 | | | 6 | |
| SCR3 | 050 | 0 | 0 | 0 | 0 | | | 6 | |
| SCR4 | 050 | 0 | 0 | 0 | 0 | | | 6 | |
| BEAR1 | 020 | 0 | 0 | 0 | 1 | | | 1 | |
| BEAR2 | 020 | 0 | 0 | 0 | 1 | | | 1 | |
| BEAR3 | 020 | 0 | 0 | 0 | 1 | | | 1 | |
| BEAR4 | 020 | 0 | 0 | 0 | 0 | | | 1 | |
| SHA1 | 030 | 0 | 0 | 0 | 0 | | | 1 | |
| SHA2 | 030 | 0 | 0 | 0 | 0 | | | 1 | |
| GW1 | 060 | 0 | 0 | 0 | 0 | | | 1 | |
| GW2 | 060 | 0 | 0 | 0 | 0 | | | 1 | |
| COV | 070 | 0 | 0 | 0 | 0 | | | 1 | |

FIG. 11

| PRODUCT POSITION NUMBER | ITEM NUMBER | PRIORITY | FOUND IN KNOWLEDGE BASE AND PARTS LIST | PLM DOCUMENT FOUND | PART SUBJECT TO WEAR | 3D MODEL | C_ID | QUANTITY | LINKAGES |
|---|---|---|---|---|---|---|---|---|---|
| HOU | 010 | 21 | 1 | | | | | 1 | |
| FLA1 | 041 | 4 | 1 | 0 | 0 | | | 1 | 96, 97, 98 |
| FLA2 | 040 | 4 | 1 | 0 | 0 | | | 1 | 99, 100, 101 |
| FLA3 | 041 | 4 | 1 | 0 | 0 | | | 1 | 102, 103, 104 |
| FLA4 | 040 | 4 | 1 | 0 | 0 | | | 1 | 105, 106, 107 |
| SCR1 | 050 | 0 | 1 | 0 | 0 | | | 6 | 108, 109, 110 |
| SCR2 | 050 | 0 | 1 | 0 | 0 | | | 6 | 111, 112, 113 |
| SCR3 | 050 | 0 | 1 | 0 | 0 | | | 6 | 114, 115, 116 |
| SCR4 | 050 | 0 | 1 | 0 | 0 | | | 6 | 117, 118, 119 |
| BEAR1 | 020 | 2 | 1 | 0 | 1 | | | 1 | 120, 124 |
| BEAR2 | 020 | 0 | 1 | 0 | 1 | | | 1 | 121, 125 |
| BEAR3 | 020 | 2 | 1 | 0 | 1 | | | 1 | 122, 126 |
| BEAR4 | 020 | 0 | 1 | 0 | 1 | | | 1 | 123, 127 |
| SHA1 | 030 | 2 | 1 | 0 | 0 | | | 1 | 129, 132, 133 |
| SHA2 | 030 | 2 | 1 | 0 | 0 | | | 1 | 131, 134, 135 |
| GW1 | 060 | 0 | 1 | 0 | 0 | | | 1 | 136, 137, 138 |
| GW2 | 060 | 0 | 1 | 0 | 0 | | | 1 | 139, 140, 141 |
| COV | 070 | 0 | 1 | 0 | 0 | | | 1 | 142, 143, 144 |

FIG. 12

| PRODUCT POSITION NUMBER | ITEM NUMBER | PRIORITY | FOUND IN KNOWLEDGE BASE AND PARTS LIST | PLM DOCUMENT FOUND | PART SUBJECT TO WEAR | 3D MODEL | C_ID | QUANTITY | LINKAGES |
|---|---|---|---|---|---|---|---|---|---|
| HOU | 010 | 21 | 1 | 0 | 0 | | | 1 | |
| FLA1 | 041 | 4 | 1 | 0 | 0 | | | 1 | 96, 97, 98 |
| FLA2 | 040 | 4 | 1 | 0 | 0 | | | 1 | 99, 100, 101 |
| FLA3 | 041 | 4 | 1 | 0 | 0 | | | 1 | 102, 103, 104 |
| FLA4 | 040 | 4 | 1 | 0 | 0 | | | 1 | 105, 106, 107 |
| BEAR1 | 020 | 2 | 1 | 0 | 1 | | | 1 | 108, 109, 110 |
| BEAR3 | 020 | 2 | 1 | 0 | 1 | | | 1 | 111, 112, 113 |
| SHA1 | 030 | 2 | 1 | 0 | 0 | | | 1 | 114, 115, 116 |
| SHA2 | 030 | 2 | 1 | 0 | 1 | | | 1 | 117, 118, 119 |
| BEAR2 | 020 | 0 | 1 | 0 | 1 | | | 1 | 120, 124 |
| BEAR4 | 020 | 0 | 1 | 0 | 0 | | | 1 | 121, 125 |
| SCR1 | 050 | 0 | 1 | 0 | 0 | | | 6 | 122, 126 |
| SCR2 | 050 | 0 | 1 | 0 | 0 | | | 6 | 123, 127 |
| SCR3 | 050 | 0 | 1 | 0 | 0 | | | 6 | 129, 132, 133 |
| SCR4 | 050 | 0 | 1 | 0 | 0 | | | 6 | 131, 134, 135 |
| GW1 | 060 | 0 | 1 | 0 | 0 | | | 1 | 136, 137, 138 |
| GW2 | 060 | 0 | 1 | 0 | 0 | | | 1 | 139, 140, 141 |
| COV | 070 | 0 | 1 | 0 | 0 | | | 1 | 142, 143, 144 |

FIG. 13

METHOD AND APPARATUS FOR GENERATING DESIGN DRAWINGS

CROSS-REFERENCE TO RELATED APPLICATIONS

This application claims the benefit of German Patent Application No. 10 2007 006 808.7, filed Feb. 7, 2007 and U.S. Provisional Application No. 60/956,044, filed Aug. 15, 2007, which are hereby incorporated by reference in their entireties.

BACKGROUND

1. Field

Embodiments of the invention relate to the field of design drawings; and more specifically, to the generation of a design drawings of design variants of a production series.

2. Background

Computer Aided Design (CAD) software is used when designing a product. CAD software may model the design in two dimensions (2D) or three dimensions (3D). The models may include one or more geometrical auxiliary figures (e.g., surfaces, planes, axes, cylinders, lines, circles and/or edges) arranged in a certain format. CAD software is used by various fields (e.g., engineering, architecture, construction, software, etc.). CAD standard software exists that conform to CAD standards.

One feature of CAD standard software is patterns. A Pattern is a special duplicating run of geometrical auxiliary figures. Thus, a series of geometrical auxiliary figures may be repeated using patterns. Another feature of CAD standard software is linkages (e.g., congruent, parallel, perpendicular, tangential, concentric, at a distance, at an angle and/or counter-aligned/aligned). Linkages are used for the mutual alignment of CAD drawings.

Product configurators allow a designer to develop products individually for a customer. Thus, a product may be designed for a customer based on the customer's desired technical specification for the product. Individual components of the product are selected and combined according to the specifications of the customer. The configurator simulates the customized product. Thus, a customer may adapt the individual components or the product itself with use of a product configurator.

BRIEF SUMMARY

Techniques for generating design drawings for design variants that are assembled from one or more components of a modular system are described herein. According to one embodiment of the invention, a first data structure in a computing device is to store the one or more components of the modular system, wherein each component includes a quantity of features. A second data structure in the computing device is to store one or more component position numbers, wherein at least one component is assignable to each of the one or more component position numbers, and each design variant is describable by assignment of the components of the modular system to component position numbers of the second data structure. A third data structure in the computing device is to store one or more rules, wherein each rule is to set at least two component position numbers in a relationship, and an assembly module in the computing device is to select the rules from the third data structure that correspond to the one or more component position numbers, and to cause a design drawing to be displayed according to the selected rules. Other methods and apparatuses are also described.

BRIEF DESCRIPTION OF THE DRAWINGS

The invention may best be understood by referring to the following description and accompanying drawings that are used to illustrate embodiments of the invention. In the drawings:

FIG. 2A is an exemplary parts list for a design variant according to one embodiment of the invention;

FIG. 3 is an exemplary component position-number catalog according to one embodiment of the invention;

FIG. 4A is a first portion of a knowledge base data structure according to one embodiment of the invention;

FIG. 4B is a second portion of the knowledge base data structure according to one embodiment of the invention;

FIG. 9 illustrates an alternative example of a knowledge-base data structure according to one embodiment of the invention

FIG. 11 is an exemplary preliminary structure list according to one embodiment of the invention;

FIG. 12 is an exemplary filled structure list according to one embodiment of the invention;

FIG. 13 is an exemplary sorted structure list according to one embodiment of the invention.

DETAILED DESCRIPTION

Figure 1:
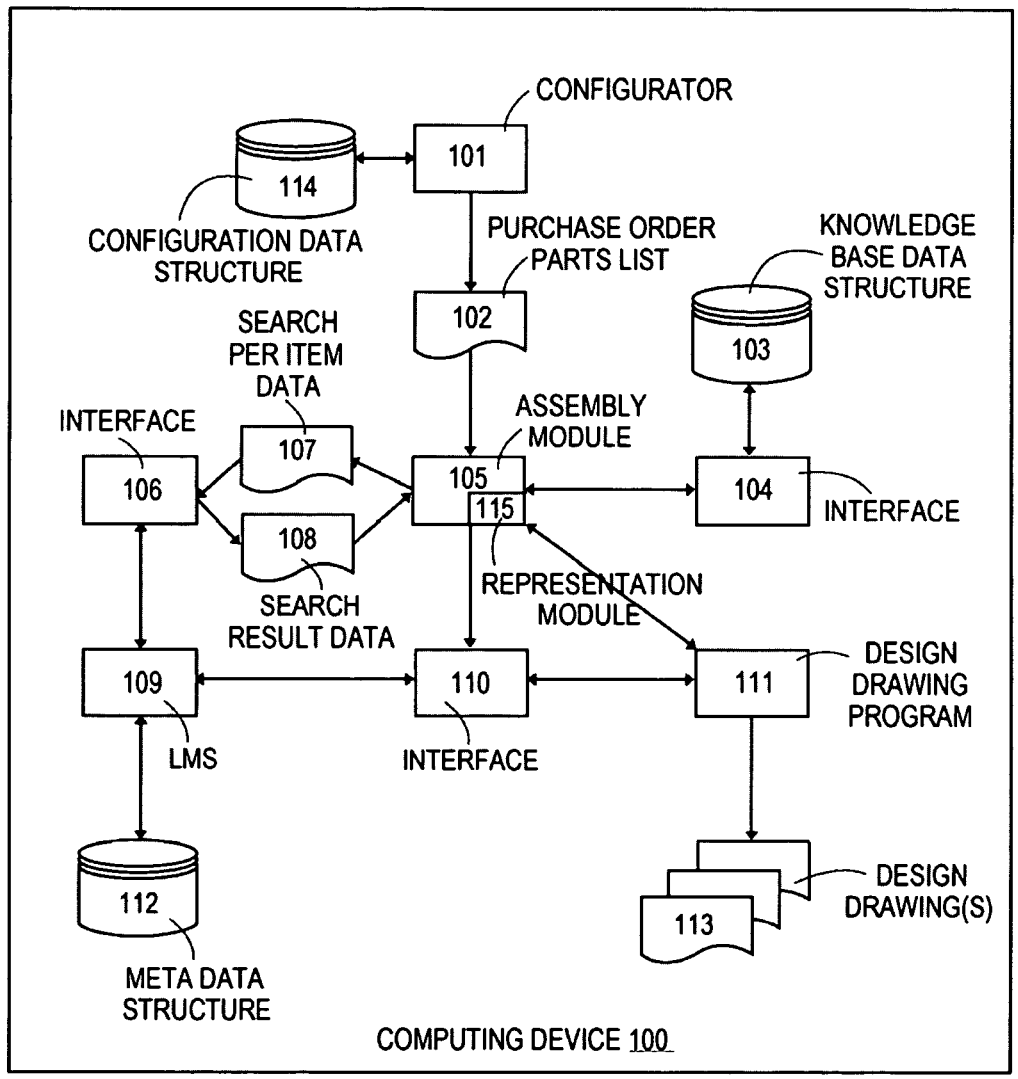
FIG. 1 is a block diagram illustrating an exemplary device according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the following description and claims, the term "data structure" may be used. This term is used to designate storage of data. While in one embodiment of the invention the data structure takes the form of a database, in alternative embodiments of the invention the data structure takes a different form (e.g., list, graph, tree, table, trie, stack, etc.).

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

A method and apparatus for generating design drawings for design variants assembled from components of a modular system is described. In one embodiment of the invention a first data structure is provided in which data is stored for each component of the modular system, each component including a quantity of features; a second data structure is provided in which component position numbers are stored, at least one component being assignable to each component position number, and each variant being completely describable by assignment of components of the modular system to component position numbers from the second data structure; and a third data structure is provided in which rules are stored, each rule setting two component position numbers in relationship, especially two features from the respective quantities of features; and that the computing device includes an assembly module, means for selecting the rules from the third data structure with respect to a list of component position numbers being provided at the assembly module. Advantageously information and/or parameters, which are applicable not only for a specific component of the modular system, but also for a class of components, do not have to be stored individually for each component, and do not have to be processed individually for each component. Therefore, a structured processing of a modular system is made possible. Particularly for automated processing proceeding mechanically or in computer-based fashion, expenditure of time and for materials may thus be reduced. The computing device is therefore advantageously designed for the computer-controlled generation of assembly drawings, in which individual work steps can be formulated independently of specific forms of the components involved.

In one embodiment of the invention, the features for each component stored in the first data structure include information concerning geometrical auxiliary figures in the design drawing of this component for the spatial alignment of the component (e.g., surfaces, planes, axes, cylinders, lines, circles and/or edges). Therefore, features are advantageously stored which are usable for forming classes of components. Advantageously, the classification relates in each instance to a quantity of features, especially of geometrical auxiliary figures, which are formed similarly in the case of the components of the corresponding class.

In one embodiment of the invention, a man-machine interface is formed via which components of the modular system are assignable to component position numbers from the second data structure to form a parts list for a design variant, the man-machine interface including means for accessing data in the second data structure. This has the advantage that a configuration tool is able to be formed with the man-machine interface, and that during a configuration process, this configuration tool is able to access the structuring, thus classification as stored in the second data structure. Thus, already in the configuration process, information for an assembly drawing able to be generated later can be made available in compact manner, saving time and data.

In one advantageous embodiment of the invention, at least one design drawing (e.g., a CAD drawing or a 3D model), especially a single-part drawing, is stored in the first data structure for each component of the modular system. This is advantageous in that single-part drawings are made available for the assembly drawing.

In one embodiment of the invention, the first data structure and the second data structure are encompassed by one data structure. For example, the first data structure and the second data structure are encompassed by one database. This offers the advantage that the maintenance of the one data structure (e.g., one database), particularly the entries into the data structure and securing of the data, may be performed easily.

In one embodiment of the invention, means are developed for processing a 3D model or a CAD drawing, particularly as a standard design drawing program. This is advantageous because the invention is able to be linked to a functional abundance of design drawing program solutions. In particular, therefore, 3D models or assembly drawings generated according to the present invention are able to be further processed without recourse to the invention.

In one embodiment of the invention, a data interface is formed via which the design drawing data, especially from the first data structure, and/or design drawing instructions (e.g., linkage instructions and/or pattern instructions) are transferable to a standard design drawing program (e.g., CAD standard software package), the assembly module including means for controlling the standard design drawing program, in particular forming an interface for transferring linkage instructions and/or pattern instructions. This has the advantage that standard design drawing program is usable for calculating and generating the assembly drawing and/or a 3D model. Ease of operation is therefore increased. Due to the development of software interfaces, the computing device is usable with various design drawing programs. Flexibility of use is thus increased. The use of standard design drawing programs offers the further advantage that an extensive, loadable functionality is available for the further processing of a design drawing.

According to one embodiment of the invention, graphs for coding the design variants of a production series (the variants being assembled from components of a modular system) are used such that each design variant is represented by a graph, especially a graph free of circles, where the nodes of the graph exactly represent the components used in the design variant, and the edges of the graph represent physical connections between the components, and the coded design variants are transferred to a computing device for the automated generating of a drawing. Therefore, the data volume necessary for generating a design drawing for design variants is advantageously reduced. The maintenance of the data structure system (e.g., the adding of new design variants) is also simplified as information is structured. Thus, information about the thread of a screw is irrelevant; however, the position of the axis of symmetry is not, if, for example, the intention is to dispose this screw in a bore hole.

In one embodiment of the invention, at least one graph for a design variant has a diameter greater than 2, the edges of the graph being provided with the weight one. This is advantageous in that not all components must be related to one particular component, since paths having more than two edges (e.g., directed paths having more than one edge) can be formed. Therefore, physical connections are able to be simulated or coded more realistically. This advantageously improves the structureability and therefore reduces the time expended for maintaining the data structures.

In one embodiment of the invention, each graph is directed, no more than one edge going off from each node, in particular the direction of the edges essentially coding an assembly sequence. Thus not only a physical connection, but also an imaginary assembly sequence is codable. Imaginary in this context relates to the fact that an actual assembly does not have to be executable in the sequence, but rather that a structuring of the components in the design variant is achievable. Therefore, this imaginary assembly sequence essentially represents an actual assembly sequence. For example, in the case of a physical connection of a gear cover to a gear housing, it is specifiable by an edge direction that the gear cover is provided on the gear housing and not vice versa. Therefore, by the edge direction, components which have fundamental importance are able to be accentuated before others. For instance, a screw is situated on a gear cover, and a washer is situated on the screw. Here, a slight deviation from an actual assembly sequence is conceivable, because it is not yet determined whether the screw is to be mounted before or after inserting the washer in the gear cover. A determination of this sequence is attainable, for example, by arrangement of the associated object classes in the second data structure. However, it is unimportant for generating a 3D model. The method described is advantageously usable for an automated generation of a drawing, in which a computing device automatically ascertains the component with which to begin.

In one embodiment of the invention, the edges are arranged in edge classes, the number of edge classes occurring in the production series being typically smaller than the total number of edges in all graphs used in the production series. Therefore, the number of graphs needed for a description of the production series is advantageously reduced. The data structures are therefore advantageously reduced in scope, and the access time and processing time are advantageously shortened.

In one embodiment of the invention, the automated generation of a drawing includes a decoding. Rules are provided for the decoding by which each edge of each graph is translatable into linkage instructions and/or pattern instructions of a design drawing program. This is advantageous because the information and structuring made available in the configuration are directly usable for generating a 3D model and/or an assembly drawing, and the software tools available in the design drawing program are usable.

According to one embodiment of the invention, a user configures a design variant (e.g., by preparing a parts list) and a computing device draws the design drawings of the components provided in the design variant from a data structure and assembles them to form a CAD drawing or a 3D model of the design variant, particularly with the aid of a standard design drawing program. This offers the advantage that production processes and/or operational sequences are able to be automated. Therefore, the number of errors is reducible, and in general, production series having a large, not easily comprehensible number of design variants are able to be processed. The processing time up to the finished generated design drawing is reducible as well.

In one embodiment of the invention, based on a parts list for the design variant, a computing device ascertains a command sequence for generating a CAD drawing or a 3D model of the design variant. Consequently, the method is advantageously able to be integrated into a configuration process.

In one embodiment of the invention, for each entry in the parts list, the parts list contains information about the use of the component in question in the design variant, particularly an object class or a component position number, and the command sequence is ascertained based on the information, given in the parts-list entry, about the use of the component in question in the design variant, particularly the object class or the component position number. The advantage here is that a structuring is provided which is comprehensible, since it is oriented to physical and/or functional conditions of the design variants of the production series. This facilitates maintenance of the data stock and troubleshooting.

In one embodiment of the invention, the command sequence is read and executed by a CAD standard software, this CAD standard software being used for representing the CAD drawing or calculating the 3D model of the design variant. Thus, the extensive functionality of CAD standard software packages may be used advantageously.

In one embodiment of the invention, a first data structure is accessed in which information, particularly design drawings, concerning all components of the modular system is stored, each component including a quantity of features, particularly geometrical auxiliary figures in the respective design drawing; and a second data structure is accessed in which object classes, particularly component position numbers, are stored, each object class including a quantity of features, at least one component being assignable to each object class, the quantity of features of the object class being a portion of the quantity of features of the component; and a third data structure is accessed in which rules are stored, each rule setting two object classes in relationship, especially two features from the respective quantities of features of components, which in each case are assignable to the object classes. This offers the advantage that data structures are used which image the structuring of the production series. By providing rules, the steps undertaken by a technical designer when generating a design drawing can be mapped in a computing device. By the use of components and object classes and the assignment of components to object classes, the design variants are codable as graphs having nodes and edges. For each rule, the two object classes which are set in relationship by the rule are stored as a first and a second entry for the rule in the third data structure. Advantageously, the information about the direction of the edges is therefore able to be stored in the rule.

In one embodiment of the invention, the design variant is generated and/or configured by a configurator, the configurator accessing the second data structure, and the design variant is described by a parts list. The advantage is that a standard software, a configurator, is usable as configuration tool, and that this configurator is able to access the structuring of the production series with the aid of object classes, and therefore the structuring of the present design variant can be made to flow into the configuration process.

In one embodiment of the invention, each object class uniquely characterizes the use of the components, which are assignable to the object class, in the design variants of the production series, particularly by reference to a component position number. Thus, one advantage of this connection is that, with the aid of object classes, the structuring of the modular system is oriented to physically and/or functionally motivated circumstances. Therefore, the assignment of a component to an object class carried out for each configuration is readable and understandable for a human user. This advantageously facilitates maintenance and troubleshooting.

In one embodiment of the invention, in a first operation, the components for the design variant are selected from a first data structure, and for each selected component, an object class is selected from a second data structure, particularly by a configurator; and in a second operation, the rules for the selected object classes are ascertained from a third data structure by a computing device; and in a third operation, based on the ascertained rules, a design drawing (e.g., a CAD drawing or a 3D model) of the design variant is generated by a computing device from design drawings of the selected components. The advantage here is that a method is made available by which an assembly drawing is able to be generated from a result of a configuration in automated fashion, that is, without human intention.

In one embodiment of the invention, the selected object classes and the selected components for the design variant define a directed graph, the edges of the graph representing the object classes, and the nodes of the graph in each case representing the component which is assigned to the object class represented by the outgoing edge. The design variant may be represented by a graph (e.g., a circle-free graph) where the nodes of the graph exactly represent the components used in the design variant, and the edges of the graph represent physical connections between the components; and using a system of rules from the third data structure, each edge of the graph is translated into a succession of linkage instructions for a design drawing program by an assembly module and/or representation module executed on the computing device, in particular the linkage instructions being brought into a specific sequence which avoids the development of ambiguities in the interpretation of the linkages, the sequence being tailored especially to the design drawing program. This is advantageous because a compact coding of design variants is made available, from which an assembly drawing and/or a 3D model is able to be generated easily and with little computational work by a computing device. A further advantage is that by using linkage instructions and/or pattern instructions, the functionality of a standard design drawing program is directly usable. It is also advantageous that, using the method, the generating of assembly drawings from single-part drawings is able to be automated (i.e., executable without additional human intervention). The selection of a sequence for the linkage instructions offers the advantage of avoiding ambiguities in the assemblage. For example, if the parallel alignment of two essentially perpendicular axes leads to an ambiguity with respect to the sense of direction of the parallel alignment, thus to a lack of clarity as to whether parallel or anti-parallel alignment is actually achieved, then interposing an intermediate step (e.g., alignment at the 45° angle) is advantageous. However, such an operation is to be carried out prior to the final alignment step, which is why the determination of a sequence is necessary.

In one embodiment of the invention, a standard design drawing program is used for generating the CAD drawing or the 3D model, whereby in a first suboperation of the third operation, a computing device sorts the ascertained rules, and in a second suboperation of the third operation, a computing device translates the sorted rules into standard commands of the design drawing program, especially while retaining the sorting, particularly whereby the CAD drawings, especially single-part drawings of all components, are maintained in the first data structure, and the design drawing program accesses this first data structure. Therefore, advantageously a method is described by which a CAD assembly drawing or a 3D model is able to be generated easily and inexpensively from an expanded parts list furnished with assemblage rules. In addition, the assembly drawing or the 3D model may be further processed with convenience.

In one embodiment of the invention, in the second operation, the following is performed by an assembly module. For the topmost entry of the parts list, or for the topmost parts-list entry provided for the design drawing representation, from the third data structure, those rules whose first entry contains the object class of the parts-list entry are ascertained and stored in a sublist with respect to the parts-list entry. This process is repeated with the next-following parts-list entry or with the next-following parts-list entry provided for the design drawing representation, until all parts-list entries are processed. In the second operation, in a sublist for each parts-list entry, an assembly module eliminates all the ascertained rules for which the object class of the second entry for the rule is not contained in the parts list, in particular, the elimination either being carried out following storing of the object classes or the elimination being carried out for all sublists after all parts-list entries have been processed, and the rules ascertained and not eliminated are stored in a structure list. The non-eliminated rules of the structure list are further processed as ascertained rules in the third operation. Therefore, advantageously a method is described by which the assemblage rules for a parts list are ascertainable from a third data structure. The method is advantageously realizable on the software side in the form of two nesting loops.

In one embodiment of the invention, the features for each component stored in the first data structure include information concerning geometrical auxiliary figures in a design drawing of this component for the spatial alignment of the component. This offers the advantage that the features are determined according to physical and/or functional standpoints. Thus, the method, particularly the filling of the data structures, is designed to be well-arranged. The rules describe linkages between geometrical auxiliary figures of the quantities of features of the object classes in question. In particular, each rule describes a linkage between two geometrical auxiliary figures from the quantities of features of the object classes in question, particularly a linkage instruction of a design drawing program. By the use of geometrical auxiliary figures as features, with the definition of linkage rules, the operations of a technical designer in working with a design drawing program in a computing device are able to be automated directly.

In one embodiment of the invention, the linkages of the rules correspond to linkage instructions as used in design drawing program and/or the linkages of the rules correspond to sequences of linkage instructions, particularly pattern instructions, as used in the standard design drawing program. The linkages used include standard linkages (e.g., congruent, parallel, perpendicular, tangential, concentric, at a distance, at an angle and/or counter-aligned/aligned). The advantage is that a standard design drawing program is usable, and that automation of the work steps of a technical designer is made possible with the aid of a computing device. The error rate is therefore reducible.

In one embodiment of the invention, the rules ascertained in the second operation for the selected object classes are arranged with an order relation in the first suboperation of the third operation, the order determining the sequence of linkage instructions in the second suboperation of the third operation. Advantageously, the ambiguities described above are avoidable using an order relation.

In one embodiment of the invention, a base object class is ascertained, particularly by counting the rules for each selected object class which relate a further selected object class to the object class, and selecting the object class having the greatest such number, or by counting the incoming edges for each node of the graph which codes the design variant. Therefore, advantageously a starting point is determinable for generating the assembly drawing. The object class in which the most components are involved is advantageously selected as the base object class, since generally it represents the housing or another fundamental component. Therefore, the computational work during the generation is kept as small as possible, since components already put in do not have to be related by calculation to a new component in the course of the generation.

In one embodiment of the invention, each rule in the third data structure is given a binary-valued attribute, and the rules ascertained in the second operation are put in order according to the value of this attribute, particularly when sorting the rules in the first suboperation of the third operation. Therefore, the possibility is created to provide intermediate operations during the alignment, whose processing enjoys priority. Ambiguities are advantageously avoidable.

In one embodiment of the invention, an order relation in the quantity of usable linkages is clarified, which is used for arranging the rules, ascertained in the second operation, for the selected object classes, particularly when sorting the rules in the first suboperation of the third operation. An order relation in the usable linkages is advantageously oriented to the functional properties of the standard design drawing program which is used. For example, it is advantageous if the order relation in the quantity of usable linkages arranges surface linkages, plane linkages, and/or edge linkages in proper order before axis linkages, and axis linkages before pattern instructions. As the component to be pattern should be aligned due to processing pattern instructions, they should be incorporated last.

In one embodiment of the invention, an order relation in the quantity of object classes is clarified, which is used for arranging the rules, ascertained in the second operation, for the selected object classes, particularly when sorting the rules in the first suboperation of the third operation. Thus, unnecessary computational expenditure is avoidable when generating the design drawing. For each object class used in the design variant, the number of rules which relate a further selected object class to the object class is ascertained, or for each object class used in the design variant, the number of edges incoming at the node representing the object class is ascertained in the graph which codes the design variant. Advantageously, in the first suboperation of the third operation, the object classes are put in order, particularly by the assembly module, in descending fashion according to the number ascertained for each object class used in the design variant. Therefore, a base object class and thus a base component is selectable easily and without human intervention. By the coding with the aid of graphs, the base object class is derivable especially advantageously as the node at which the most directed paths end. This selection is advantageously integrated in the assembly module.

In one embodiment of the invention, in the second suboperation of the third operation, a representation module accesses an interface via which design drawing data, particularly single-part drawings of the components of the design variant, are loaded into the standard design drawing program. In the second suboperation of the third operation, a representation module accesses the standard design drawing program and creates an assembly group in it, loads the single-part drawings of the components of the design variant into the assembly group, selects in them the relevant auxiliary figures according to the ascertained rules, links, and/or patterns them according to the ascertained rules, and the standard design drawing program calculates a design drawing of the design variant. The design drawings for the components may be managed by a PLM (Product Lifecycle Management) software, and the design drawing version current in each instance is used for generating the design drawing of the design variant. Therefore, a method is provided, which is able to be used compatibly with standard software packages for data management customary in the case of standard design drawing program. Advantageously, human interventions and/or decisions are avoidable when generating the design drawing; the degree of automation is high.

According to one embodiment of the invention the data structures are accessed via an intranet or the Internet. The software modules (e.g., input masks, applets) are therefore installable on a locally existing computer or controllable via the Internet. The 3D model and/or derived drawings are transmittable via the Internet.

In one embodiment of the invention, a CAD drawing, in which the object classes for the components are represented as position numbers, is derived from a 3D model of the design variant. Thus, a drawing usable by a fitter, a design engineer and/or a sales engineer is able to be generated.

In one embodiment of the invention, the design variants represent design variants of a production series of gear units, the components being given by the usable single parts of the gear-unit variants, and the object classes denoting quantities of components of the modular system which have a relation in common to a further component of the modular system. The advantage in this context is that the abundance of variants typical for a production series of gear units is controllable by the method.

In one embodiment of the invention, individual or all data structures are implemented as SQL (Structured Query Language) databases having interfaces. Advantageously, a version control is thus able to be provided for the data structures. The method is therefore usable for production series having a great abundance of parts and/or a great abundance of variants.

In one embodiment of the invention, the generated 3D model or the generated CAD drawing is displayed using a design drawing viewing program, particularly a viewer, the 3D model or the CAD drawing being generated in the assembly module or in the representation module. In one embodiment of the invention, the representation module is encompassed by the assembly module. Thus, a compact realization of the invention in software modules is made possible. This offers the advantage that the invention is usable by a user who would like to obtain a design drawing of a desired design variant at a workstation remote from the data structure, information being exchanged via the Internet or an intranet. In particular, the user is able to use a conventional computing device (e.g., a laptop) for connection to the data structures and the assembly module, and it is possible to dispense with complicated and costly software on the computer of the user because the output data of the expanded assembly module or of the expanded representation module or of an additional module situated in the data flow between the assembly module and the user is readable for the user using a viewer usually obtainable free of charge.

According to one embodiment of the invention in a first operation, a selected design variant is defined and/or configured using a parts list; in a second operation, rules stored in a data structure are evaluated for linking the items of the parts list; and in a third operation, mounting instructions, and/or manufacturing instructions and/or design drawings are derived from the evaluated rules. It is advantageous that the production is able to be automated and, in particular, is able to be initiated from a distance. It is particularly advantageous that with the drawings, which on their part may have position numbers, mounting instructions are able to be generated, which are derived from the ascertained sequence of the ascertained rules.

Certain embodiments of the invention are used for planning and design and/or the offer for sale of design variants of a production series (e.g., gear units of a gear unit production series). It is advantageous that a modular system having a great abundance of parts and/or great abundance of variants is manageable, the processes for generating 3D models and/or other representations being able to be automated. Therefore, human errors are avoidable in the generating process, and the generating time is able to be shortened.

Figure 15:
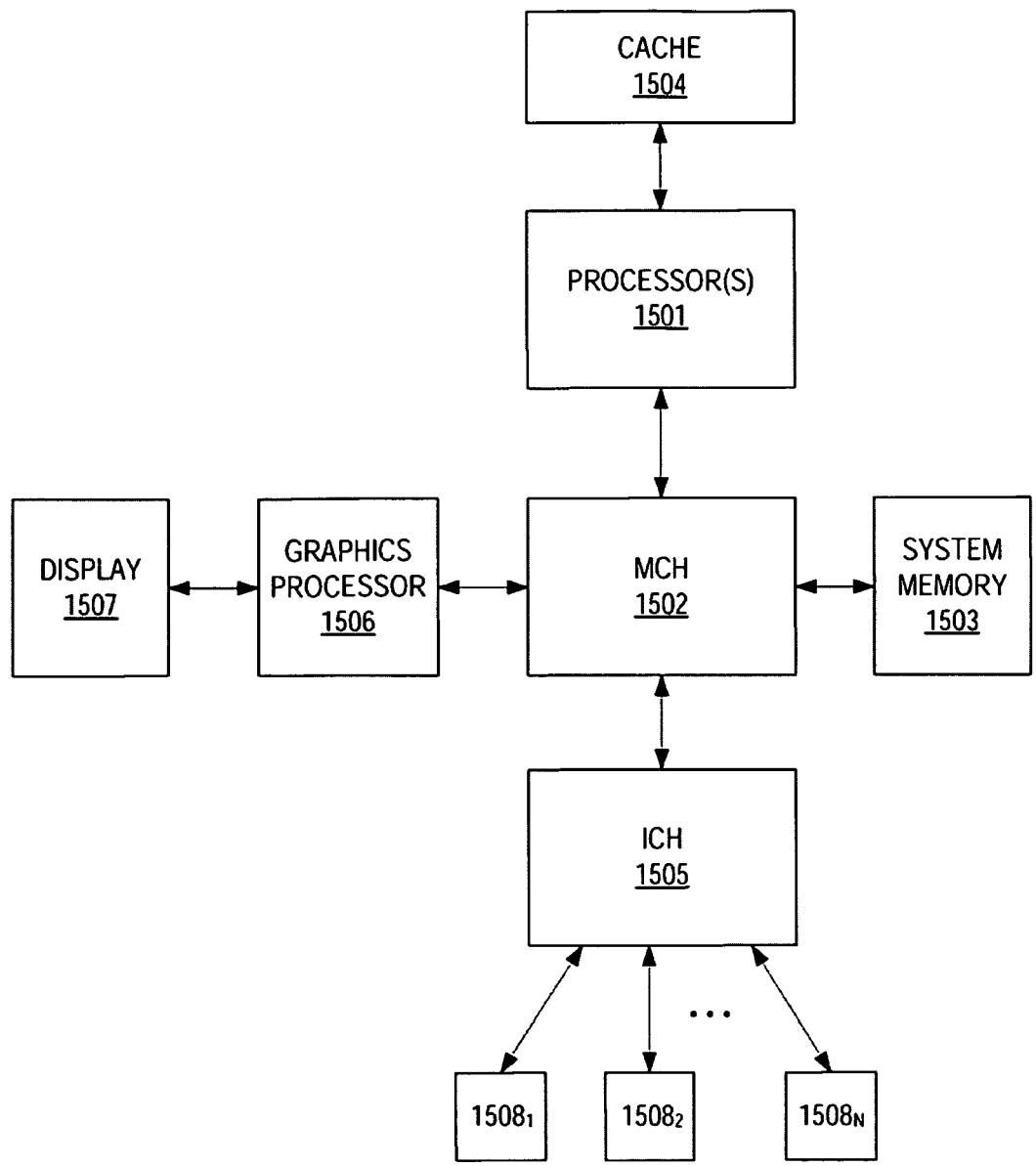
FIG. 15 illustrates an example computer system according to one embodiment of the invention.

FIG. 1 is a block diagram illustrating an exemplary computing device 100 that is configured to automatically generate a design drawing of a design variant of a production series according to one embodiment of the invention. However, according to one embodiment of the invention some of the components illustrated in FIG. 1 may exist in different computing devices that are coupled with the computing device 100. Thus, it should be understood that in certain embodiments of the invention the location of the components illustrated in FIG. 1 are not within a single computing device. It should also be understood that well known components of the computing device 100 are not illustrated in FIG. 1 for simplicity purposes (e.g., processor(s), bus(es), input/output devices, memories, controllers, cards, logic circuitry, display, peripheral(s), etc.). According to one embodiment of the invention the computing device 100 is a computer system (e.g., workstation, server, laptop, etc.) that includes an installation of a CAD software program. According to one embodiment of the invention the computing device 100 is a computer system as illustrated in FIG. 15.

FIG. 1 shows the components of a computing device 100 that is configured to automatically generate design drawings of design variants of a production series that includes a 3D configurator and the information and data flow between the 3D configurator and other components, as well as the final products (e.g., design drawings of the design variant of the production series). The 3D configurator is used in generating design drawings of design variants of a production series. The design drawing is an illustration or sketch of the design variant of the production series. While in one embodiment of the invention the design drawing is a CAD drawing, in alternative embodiments of the invention the design drawing is a 3D model. A production series is used to refer to large amounts of standardized products (e.g., mass production of a product). Thus, a design variant of the production series is a variation of the standardized product (e.g., a customized version of a standardized product). According to one embodiment of the invention, the production series includes products of a modular system (i.e., made of individual components). For example, a modular system may be a gear unit, where the individual components may include shafts, wheels, screws, flanges, bearings, etc. Other exemplary modular systems include electric motors, automobiles, automobile components, semitrailers, means of transport, furniture, switchgear cabinets, shelf systems, kitchen systems, manufacturing facilities, or other products that are assembled from components. A design variant of a modular system may include different types of the same components (e.g., different sizes, different quality, different shapes, etc.), different numbers of the components, different placement of the components, different combinations of the components, and/or different components, as each compared to the production series.

A configurator 101 is installed in the computing device 100 as illustrated in FIG. 1. According to one embodiment of the invention the configurator 101 is a configuration tool by which a purchase-order parts list 102 is able to be generated for each desired design variant of the production series (e.g., an SAP/R3 configurator). According to one embodiment of the invention, the information in the purchase-order parts list 102 is specific to a technical specification of a customer and the customer provides the technical specification through use of a medium (e.g., telephone, paper, Internet, etc.). To generate the purchase-order parts list 102, the configurator 101 accesses a configuration data structure 114. The configuration data structure 114 stores information about the components of the modular system and information about the possible use of the components within the production series for forming the design variants. For example, the configuration data structure 114 may store information about the placement of specific components in the modular system. Advantageously, during the configuration process, the configurator 101 is able to access the configuration data structure 114. Thus, during the configuration process, information for an assembly drawing able to be generated later can be made available in a compact manner, saving time and data.

FIG. 2A an exemplary purchase-order parts list 102 for a design variant according to one embodiment of the invention. By way of example and not limitation, the purchase-order parts list 102 is for a design variant of a gear-unit modular system. It should be understood that although the purchase-order parts list 102 is for a design variant of a gear unit, many other design variants of modular systems may be represented by the purchase-order parts list 102 (e.g., electric motors, automobiles, automobile components, semitrailers, means of transport, furniture, switchgear cabinets, shelf systems, kitchen systems, manufacturing facilities, or other products assembled from components of a modular system). Thus, the gear-unit design variant is meant to be illustrative and not limiting.

The purchase-order parts list 102 includes information identifying the technical specification of the work order (e.g., received from the customer) for the particular design variant of the production series. For example, the purchase-order parts list 102 includes a number to identify the purchase order (e.g., purchase order 1), a descriptive keyword identifying the design variant (e.g., gear unit number 1), and information about the position of the shafts of that design variant. The shaft position is coded by a plurality of numerals which denote the positions at which shaft stubs are provided. It should be understood that if the design variant of the modular system does not include shafts (e.g., it is not a design variant of a gear unit), then the purchase-order parts list 102 does not include positioning of the shafts. Additionally, it should be understood that purchase-order parts list for different modular systems may include information about the position of other components of the design variant of the modular system (e.g., a point on the design variant where one or more components may be situated upon). Thus, the positioning information is not limited to shafts of a design variant of a gear unit.

Figure 8:
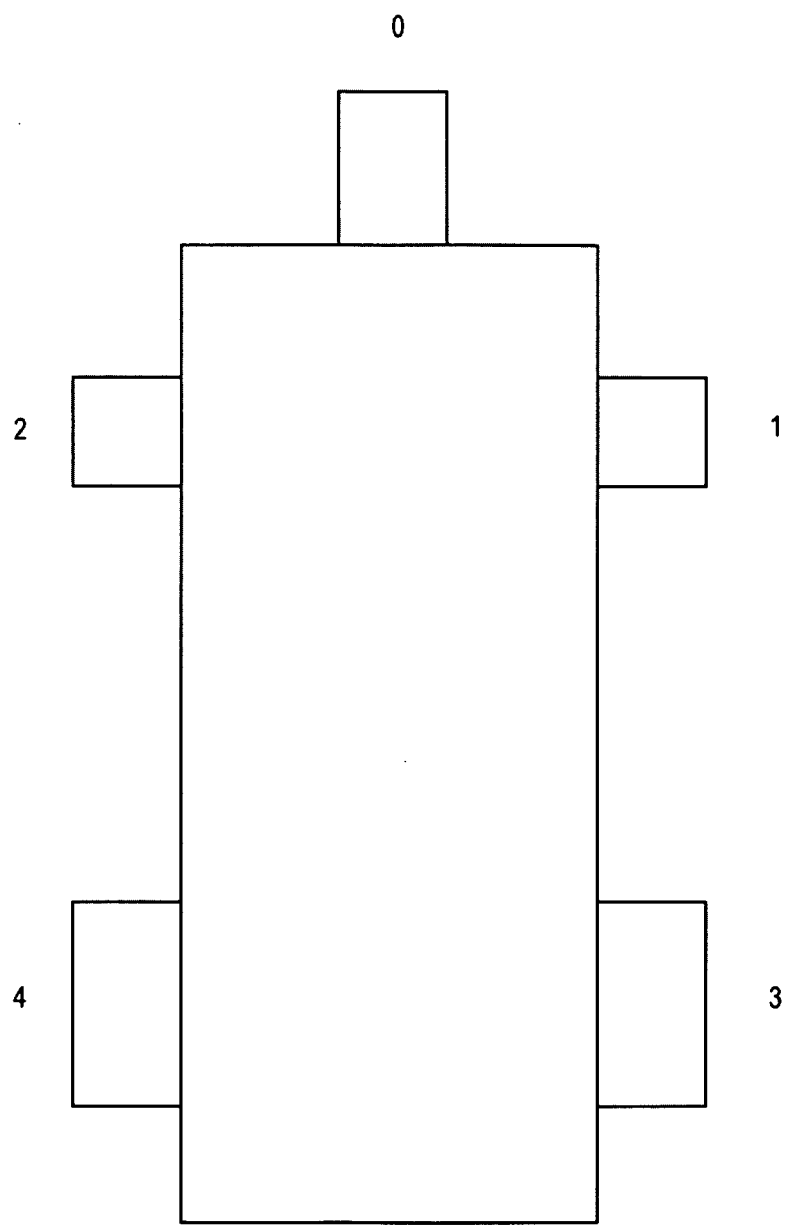
FIG. 8 is a block diagram illustrating positions of shaft stubs in the housing of a gear unit according to one embodiment of the invention.

As an illustration of positioning information, FIG. 8 illustrates exemplary positions of shaft stubs in the housing of a gear unit according to one embodiment of the invention. Referring to FIG. 8, positions 0, 1, and 2 belong to input shafts, while positions 3 and 4 are assigned to output shafts. Position 0 is provided for the input shaft of a bevel-gear set of a right-angle gear unit. Thus, the purchase-order parts list 102 of FIG. 2A describes a gear unit whose input shaft is provided at position 2, while the output shaft is provided at position 4. While according to one embodiment of the invention the purchase-order parts list 102 takes the form of a list, in alternative embodiments of the invention the purchase-order parts list 102 is stored differently (e.g., a table, a database, a trie, a hash, etc.). Thus, the purchase-order parts list 102 is illustrated as a table for illustrative purposes.

Each row of the table representing the purchase-order parts list 102 describes one component or one part which belongs to the design variant. The first column in the table includes a row number for identifying each entry. According to one embodiment of the invention the row number is optional and is used for describing the invention. The second column includes information about the use of the component in the form of a component position-number. FIG. 3 is an exemplary component position-number catalog 300 according to one embodiment of the invention. For each usable component position number, the component position-number catalog 300 of FIG. 3 supplies a description which establishes the use of the component in question. According to one embodiment of the invention, the component position number catalog 300 of FIG. 3 is stored in the configuration data structure 114 and is maintained there, and the configurator 101 uses the component position number catalog 300 when generating the purchase order parts list 102. The component position-number catalog 300 includes information on each usable component position number. Thus, the component position number catalog 300 may include component position numbers which are not included in the design variant. For example, in the case of a helical design variant of a gear unit, the input shaft and the output shaft are parallel. Thus, "Fla0", "Bear0", and "Scr0" are not used for a helical gear unit (these component position numbers correspond to position 0 in FIG. 8 which is used for the input shaft of a bevel-gear unit). In the case of a bevel-gear unit, the input shaft is disposed at position 0 in FIG. 8, which is why the indicated component position numbers for a bevel-gear unit variant must be occupied with item numbers. Thus, a data structure (e.g., table, list, database, trie, hash, etc.) of all component position numbers is stored in the configuration data structure 114, and is used by the configurator 101 for generating the purchase-order parts list 102.

Thus, for example, it should be understood that from row 8 of the purchase order parts list illustrated in FIG. 2A and from the component position number catalog 300 illustrated in FIG. 3, particularly row 19, that six components having the item number "050" are provided as screws at the flange for the shaft opening in the case of shaft position "3". Depending on the makeup of the modular system, the component position numbers may be associated with examples not illustrated in the component position numbers of FIG. 3. For example, component position numbers may be associated with a closure for an opening in a housing wall, a screw for that closure, a seal for that closure, a sealing system for a specific shaft position, a housing, etc.

The third column in FIG. 2A includes the item number of the component. A specific component which is to be fitted in the design variant according to the indicated component position number is identifiable by the item number. In the case of a gear unit modular system, specific components denoted by item numbers may include a gear wheel having a certain number of teeth and certain dimensions, a shaft having a specific length, a specific diameter and a specific material quality, a cylinder-head screw having specific dimensions, a hexagon head screw having specific dimensions, and a housing cover in a certain form. It should be understood that although specific components as identified by the item number in FIG. 2A are related to a design variant of a gear unit, these components are illustrative as many other different components may exist for different design variants of a different modular system.

The fourth column in FIG. 2A includes the quantity as to how often the component occurs in the design variant. In this context, only those components are combined for which the use (e.g., the component position number) is the same. In the design variant of FIG. 2A, the screw having item number "050" is installed 24 times (six times each at flanges "Fla1" through "Fla4", which on their part are occupied by components "040" and "041" respectively).

The fifth column in FIG. 2A indicates whether the component is a CAD part. For example, if the component is a CAD part the field in the fifth column will be a 1. If the component is not a CAD part the field in the fifth column is a 0. For example, the manual "ManEn" and the lubricant "Oil1" are not components that will be included in a CAD representation of the design variant. Therefore, these components have a "0" in the fifth column to indicate that they are not CAD parts. According to one embodiment of the invention, if the components are not CAD parts they are not included in the final generated CAD drawing of the design variant. It should be understood that if the design drawing is not a CAD drawing (e.g., the design drawing is a 3D model), the fifth column may indicate whether the components are 3D model parts.

The sixth column in FIG. 2A indicates whether the component is a part subject to wear. For example, if the component is a part subject to wear the field in the sixth column will be a 1. If the component is not a part subject to wear the field in the sixth column will be a 0. According to one embodiment of the invention, parts subject to wear in the design variant are able to be highlighted in the CAD representation of the design variant or the 3D model of the design variant. It should be understood that certain modular systems may not include components that are subject to wear, thus, in these modular systems the sixth column may be excluded or optional.

The seventh column in FIG. 2A indicates the type of component. For example, the value "1" indicates a single part, the value "2" indicates an assembly group (i.e., a group of single parts), and the value "0" for other miscellaneous parts. In the design variant of the modular system represented by FIG. 2A, cover "070" is denoted as an assembly group as it forms one unit With holding eyelets "080" and seal "075". As eyelets "080" and seal "075" are included in a CAD representation of the cover "070", the eyelets "080" and seal "075" are not denoted as a CAD part in column five. It should be understood that certain modular systems may not include components that make up other components (e.g., an assembly group), thus, in these modular systems the seventh column may be excluded or optional.

According to one embodiment of the invention, in each purchase order parts list 102 that is generated, each component position number appears no more than one time. In certain design variants, many component position numbers do not appear in the purchase order parts list 102. Depending on the structure of the modular system, different variants are able to be formed where the same component position number in the respective parts lists 102 is assigned to different item numbers.

Figure 2B:
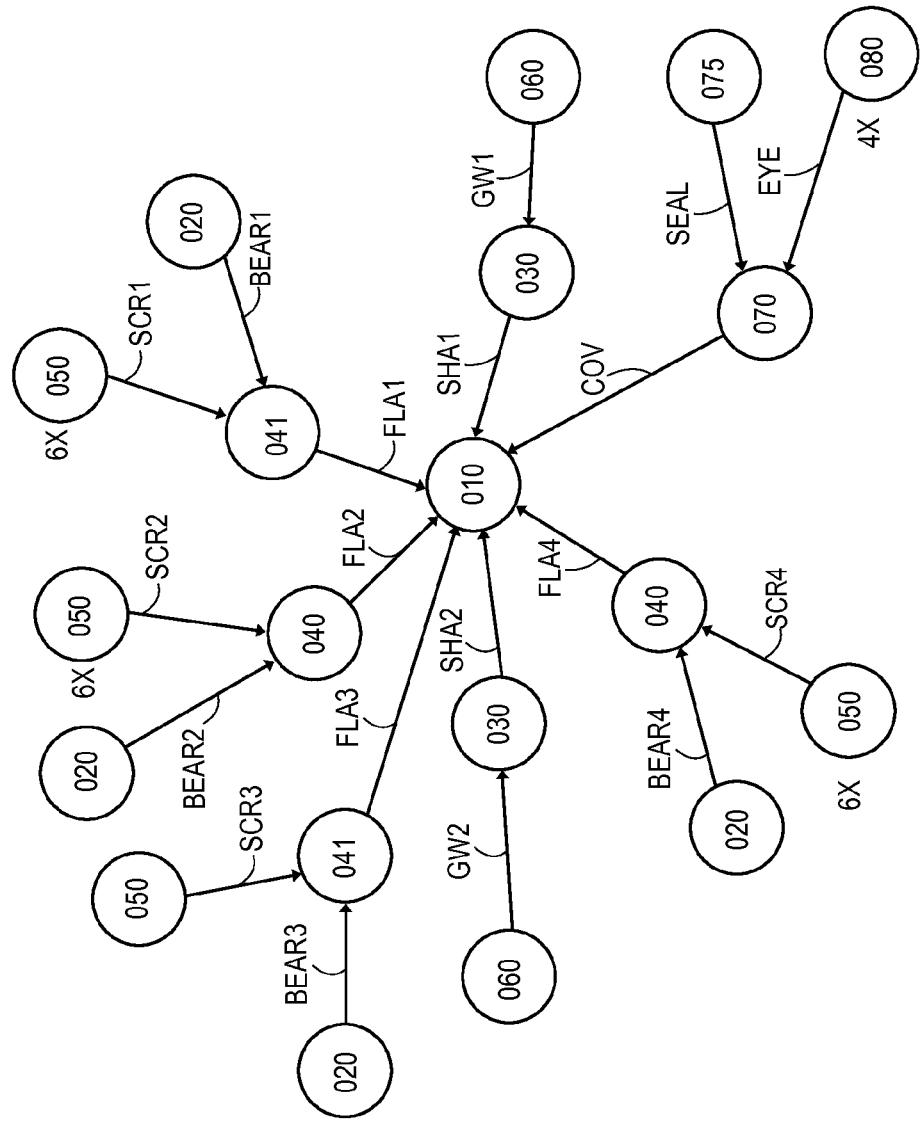
FIG. 2B is an exemplary graph of the exemplary parts list of FIG. 2A according to one embodiment of the invention.

Thus, the purchase order parts list 102, in addition to including information about the technical specification of a design variant, includes information as to how the individual components of the design variant interrelate. This information may be displayed by a graph as in FIG. 2B. In FIG. 2B, the nodes of the graph represent the specific components of the design variant, denoted by the relevant item number, and the edges represent the component position numbers. The direction of the edges results from the respective entry in the description of FIG. 3, particularly in connection with the word "for". Using the same example of a design variant of a gear unit, the edge denoted by "Bear3" in the description of FIG. 3 indicates that "Bear3" is a bearing for flange "Fla3", thus in FIG. 2B the component bearing "020" has an edge "Bear3" directed towards the flange "041". Additionally, in each case the quantity is indicated if greater than one. For example, according to the purchase order parts list 102 represented in FIG. 2A there are six "Scr1" component position numbers, thus in FIG. 2B there is a "6×" besides item number "050" corresponding to the "Scr1" component position number. FIG. 2B also illustrates the type of component. For example, the component position numbers "seal" and "eyelet" are represented by dotted edges since components "075", "080" and "070" are assigned as one assembly group in the purchase order parts list of FIG. 2A. These components may be designated as one assembly group. Additional information may also be specified in FIG. 2B. For example, additional information about the arrangement of the shaft stubs (e.g., by denoting the shaft position) and about parts that are not CAD parts (e.g., lubricating oil, operating manuals) may be specified in FIG. 2B.

The graph illustrated in FIG. 2B is completely derivable from the information in columns 1 through 3 of the purchase order parts list 102 in conjunction with the list of all possible component position numbers according to the component position number catalog 300 illustrated in FIG. 3. Thus, the purchase order parts list 102 includes more information than a mere statement of the individual parts from which the design variant is assembled.

The graph illustrated in FIG. 2B contains no circles or cycles. In other words, no more than one directed edge goes out from each node. This corresponds to the specification of a single use for each component position number. The directed edges of the graph define directed paths which end at the node "010". The length of a path (i.e., the number of edges of which a path is composed) is generally different from path to path. For example, there are paths whose length is greater than one.

Therefore, the diameter of the graph is also greater than one. Thus, the information in the purchase order parts list 102 illustrated in FIG. 2A is different from the use of a master in which all components would be indicated in relation to a primitive and all paths in the graph would have the length of one. By using graphs having a diameter greater than one, the components are advantageously able to be grouped to form assembly groups (e.g., for a CAD representation or a 3D model of the assembly group or for production).

Referring back to FIG. 1, the purchase-order parts list 102 is input into an assembly module 105. While according to one embodiment of the invention the purchase-order parts list 102 is input into the assembly module 105 through a use of a paper printout, in alternative embodiments of the invention the purchase-order parts list 102 is inputted into the assembly module 105 differently (e.g., data file on a storage medium, stored on information carrier, etc.). The input is carried out according to the respective information carrier.

According to one embodiment of the invention the assembly module 105 is included in the computing device 100. Via an interface 104 (e.g., SQL interface if the knowledge-base data structure 103 is a SQL database), the assembly module 105 accesses knowledge-base data structure 103 in which, in the form of rules, pairs of component position numbers are associated with linkage instructions and/or pattern instructions. Also via the interface 104, the assembly module 105 automatically ascertains those entries (e.g., the rules) in knowledge-base data structure 103 which are relevant according to the purchase-order parts list 102. The assembly module 105 evaluates the ascertained rules automatically, and using those ascertained rules, by way of a design drawing program 111 (e.g., CAD standard software), to generate one or more design drawings 113 which show the design variant in assembled form. While in one embodiment of the invention the design drawings 113 are displayed on a display coupled with the computing device 100, in alternative embodiments of the invention the design drawings are stored and are made available to other computing devices (e.g., the design drawings are made available to be viewed or distributed over a WAN and/or LAN, and/or distributed to different computing devices through use of a storage medium).

The assembly module 105 accesses a interface 110 (e.g., a CAX interface) which, via a Lifecycle Management Software 109, loads design drawing representations of components and/or component data from a metadata base 112, and passes them on to design drawing program 111. The assembly module 105 likewise accesses Product Lifecycle Management software 109 via a PLM interface 106, and gives search pattern data 107 to metadata base 112, or receives search result data 108 from it. The search result data 108 and search pattern data 107 may be stored on any storage medium and/or information carrier as desired.

Thus, according to one embodiment of the invention the exemplary device illustrated in FIG. 1 includes at least three data structures. A first data structure in the form of metadata base 112 in which at least the design drawing data (e.g., CAD data, 3D model data) necessary for a design drawing representation of the individual components of the modular system is stored; a second data structure in the form of a configuration data structure 114 includes object classes (e.g., at least one list of all component position numbers usable at all in the production series) where each object class includes a quantity of features, and where at least one component is assignable to each object class; and a third data stricture in the form of a knowledge-base data structure 103 in which rules are stored, each rule setting two component position numbers in a relationship. By providing rules, the steps undertaken by a technical designer when generating a design drawing can be mapped in a computing device. By the use of components and object classes and the assignment of components to object classes, the design variants are codable as graphs having nodes and edges. It should be understood that these data structures may be organized as one data structure. For example, these data structures may be organized as one SQL database. If the data structures are organized as one data structure (e.g., one database) maintenance of the data structure, particularly the entries into the data structure and securing the data, may be performed easily. However, according to one embodiment of the invention, if the data structures are physically or logically separated (e.g., depending on the data structure size) the data is transmitted to and from the data structures via the Internet or via an intranet.

In one embodiment of the invention, for each rule, the two object classes which are set in relationship by the rule are stored as a first and a second entry for the rule in the third data structure. Advantageously, the information about the direction of the edges is therefore able to be stored in the rule.

FIG. 4A and FIG. 4B illustrate an exemplary knowledge base data structure 103 according to one embodiment of the invention. Each row of the knowledge base data structure 103 defines a single rule. Initially, the sequence of the rules is arbitrary and results from the requirement to be able to maintain the knowledge-base data structure 103 in a structured fashion.

Each rule sets two component position numbers in relation to each other (e.g., SN1 and SN2 under the designation serial number in the knowledge base data structure 103). Each rule describes the determination of exactly one degree of freedom of movement which the components in question—that in each case may be assigned to the component position numbers—have relative to each other. In the case of parts axially symmetrical per se (e.g., shafts of a gear unit) the degree of freedom associated with the symmetry is determined by a symmetry refraction. For example, feather keys of the shafts of a gear unit are to be directed upward in standard manner. The determinations are made with the aid of the data entered in the columns "linkage", "designation1" and "designation2". Rules of knowledge-base data structure 103 which relate to component position numbers that are not specified in purchase-order parts list 102 of FIG. 2A are suppressed in FIGS. 4A and 4B in order to maintain clarity. Thus, the knowledge base data structure 103 includes rules for each component position number in the component position number catalog 300 according to one embodiment of the invention.

In the case of a linkage rule, according to one embodiment of the invention "designation1" names the designation of a geometrical auxiliary figure which is defined in the CAD drawing of each component of the modular system, that is assignable to the component position number listed under "SN1", and analogously "designation2" names the designation of a geometrical auxiliary figure for the component position number listed under "SN2". Planes, surfaces areas, also curved (e.g., physically given such as upper surfaces or boundary surfaces), edges, also non-linear (e.g., physical, axes or points), as well as uniform layouts and patterns may be provided as auxiliary figures.

Figure 7:
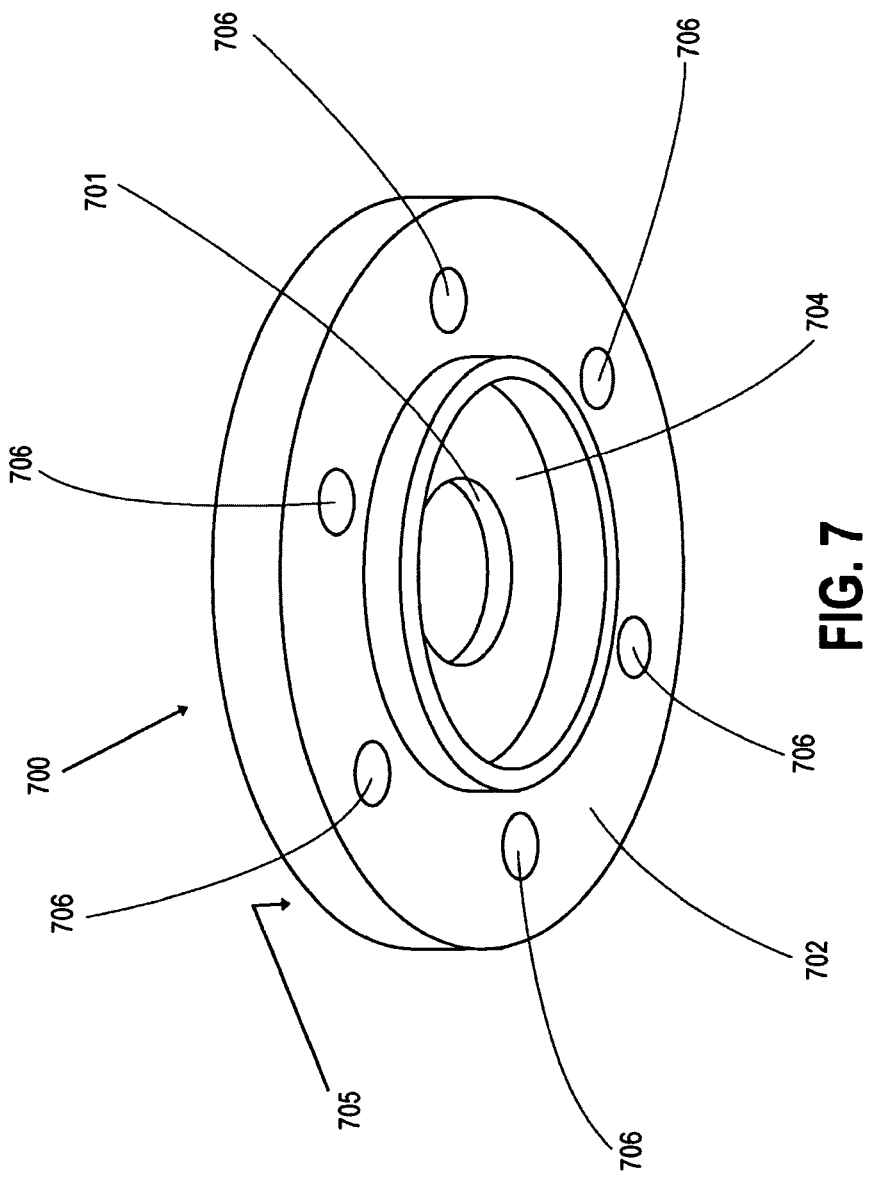
FIG. 7 is an exemplary CAD view of a component from the parts list of the design variant of FIG. 2A and FIG. 2B according to one embodiment of the invention.

For example, FIG. 7 is an exemplary CAD view of a component from the parts list of the design variant of FIG. 2A and FIG. 2B according to one embodiment of the invention. The labeling of auxiliary figures in the 3D models of the individual components is generally based on how the individual components are connected to each other in an assembled state. Each of the auxiliary figures is used to establish the degree of physical freedom of motion.

In the case of a design variant of a gear unit, with discreetly or continuously rotationally symmetrical components, the axis of symmetry or a cylinder jacket surface arranged concentrically thereto is first labeled. Examples of such rotationally symmetrical components are shafts, screws, bearings, gaskets and washers, spacer bushings, gears, or rotationally symmetrical casing sections. For example, in the case of a shaft, this auxiliary figure can be the surface of an axial section of the shaft that has a constant diameter. In the case of a screw it can be the envelope of the thread region. In the case of a bearing it can be the inner surface of the inner bearing ring, the outer surface of the outer bearing ring, or a cylinder jacket surface defining the middle of the cylinder component. In the case of a gasket, washer, or spacer bushing, it can be the inner surface or the outer surface referring to a radial direction. In the case of a gear it can be the inner surface of the center hole or a cylinder jacket surface that defines the gear's tip circle, root circle, or reference circle; and in the case of a rotationally symmetrical casing section it can be the radially located inner seating surface for a bearing ring. As a result, symmetry-breaking, geometric features, for example, the thread profile of a screw or the feather key groove of a shaft or the toothwork of a gear, are not taken into consideration in this labeling.

The rules that connect these auxiliary figures with other auxiliary figures for purposes of guaranteeing partial arrangement include arrangement commands that refer to a likewise rotationally symmetrical auxiliary figure in which the accompanying component is received or which the accompanying component receives. Examples of these types of pairings include, the outer surface of a shaft section with the inner surface of a gear, a spacer bushing, or a bearing ring, wherein this inner surface is part of the contact surface between the shaft and gear, spacer bushing, or bearing ring; the envelope of the thread profile of a screw with the inner surface of a hole into which the screw is screwed, wherein the details of the thread profiles of the screw connection are not taken into consideration; the radial outer surface of a projection encircling a casing cover with the inner surface of an opening in an additional casing section, wherein the projection of the casing cover is placed into the opening; and the outer surface of an outer bearing ring with the radial inner surface of the hole of a casing section, wherein the bearing ring is placed into the hole.

These pairings thus refer to the rotationally symmetrical surfaces that contact each other in the assembled gearwork or that, for example in the case of a thread profile or a feather key, reproduce these contact surfaces in rotationally symmetrical approximation.

The labeling of at least one additional auxiliary figure is necessary for arranging the rotationally symmetrical component with regard to an additional component. For this purpose, a plane is selected that is arranged perpendicular to the axis of symmetry and that describes the relative axial position. This plane describes the axial position toward which the relevant components are pushed together. The selection of the plane is based on the stops and contact surfaces that actually result in the assembled gearwork. For example, in the case of a shaft, this can be the axial lateral surface of a collar upon which a inner bearing ring or a spacer bushing is positioned. In the case of a screw, this can be the seating surface of the screw head. In the case of a bearing, this can be the axial lateral surface of a bearing ring with which the bearing is axially fixed on a shaft collar, spacer ring or in a casing hole. In the case of a gasket or washer, this can be a lateral surface with which the gasket or washer is axially fixed in a groove. In the case of a spacer bushing, this can be a lateral surface with which the spacer bushing is axially fixed to a gear, bearing ring shaft collar, or lock washer. In the case of a gear this can be the lateral surface of the center of a gearwheel or the radial region of a lateral surface bordering a wheel hole with which the gear is fixed by contact with a spacer bushing, shaft collar, lock washer, retaining ring or bearing ring; or in the case of a rotationally symmetrical casing section, this can be the seating surface of the casing section on an additional casing section or the axially-oriented inner lateral surface—thus the bottom—of a hole for receiving a bearing.

The rules that connect these auxiliary figures with other auxiliary figures for purposes of guaranteeing partial arrangement include arrangement commands that refer to an additional auxiliary plane, wherein both auxiliary planes contact each other in the assembled gearwork or both auxiliary planes maintain a set distance from each other in the assembled gearwork, which distance is, for example, provided by an additionally inserted component.

Furthermore, the complete fixing of the remaining third degree of freedom should also be established, for example, in order to permit the movement of two components together as only one around their axis of rotation. For this purpose, a plane is used that defines the contact surface for this fixing in the assembled gearwork or that characterizes the rotationally symmetry-breaking geometric shape required for the fixing. For example, in the case of a gear, this is a lateral surface moving in a circumferential direction of the countersinking or groove for the feather key; or a plane containing the axis of symmetry that marks the middle plane in the circumferential direction of this countersinking or groove; or the line of contact in one point in a tooth profile. In the case of a shaft connection, thus a coupling, an axial plane is selected that characterizes the working surfaces, thus the bevels, for the transfer of energy, or a plane that lies in this working surface.

For labeling non-rotationally symmetrical components, for example, casing covers or casings of externally-mounted components such as pumps, surge tanks, oil storage tanks, filters, condensers, or electronic components, the inner surfaces of at least two holes in the components are used, wherein the holes receive screws, rivets, or bolts for mounting, as well as a plane that defines the physical seating surface of the component on another component.

Therefore, in one embodiment of the invention at least one auxiliary figure is labeled on each component, which has a clearly established axis of symmetry for rotational symmetry. It should be understood that a mathematical abstraction extending into infinity is never selected when labeling auxiliary figures, but rather a portion thereof relating to, for example, the dimensions of the component.

Referring back to FIG. 7, component "040", a flange for a gear unit, is illustrated as 3D model 700. In the flange, the following auxiliary figures are included: cylindrical surface 701 with the designation "F_CF_1", cylindrical surface 703 with "F_CF_3", annular surface 702 with "F_PF_1", surface 705, opposite this surface on the backside of 3D model 700, with "F_PF_3" and annular surface 704 with "F_PF_2". In addition, a pattern "screw-connection pattern" is defined in which the screw hole belonging to surface 703 is used as reference point, and remaining screw holes 706 are used as sketch points. Since in principle, component position numbers "Fla1", "Fla2", "Fla3" and "Fla4" in the example are interchangeable parts (see FIG. 5) the auxiliary figures marked with names are identical.

In the column "linkage" in FIGS. 4A and 4B, in the event the rule is a linkage rule, the linkage instruction is indicated, which sets the two auxiliary figures in a spatial relationship by establishing a spatial, relative degree of freedom of movement of the two auxiliary figures. The list of possible linkage instructions includes the standard linkages known in standard design drawing programs: congruent, parallel, perpendicular, tangential, concentric, at a distance, at an angle. Additionally, custom linkage instructions may also be used. The linkage instruction is further specifiable by a linkage alignment relating to the mutual orientation, the values aligned and counter-aligned being assignable. However, expanded linkages may also be provided.

For example, row 123 of the knowledge base data structure 103 in FIG. 4B describes a linkage rule in which a surface "S_PF_1" in the component having the component position number "Bear4" is linked congruently and counter-aligned with a surface "S_PF_2" in the component having the component position number "Fla4". In other words, a bearing ("Bear4") for the flange ("Fla4") for the shaft opening at shaft position "4" is thus aligned relative to the flange in such a way that a surface on the bearing, here the plane going through a lateral surface of the bearing, lies congruently with a surface of the flange, here the plane in which the contact surface of the flange with the bearing runs, the bearing being disposed on a specified side of the flange. Referring to FIG. 7, a lateral surface of the bearing is made to coincide with surface 704.

As another example, row 140 of the knowledge base data structure 103 describes that the inner surface of the central borehole of the gear wheel having the component position number "Gear2", surface "S_CF_1" is disposed concentrically with respect to cylinder surface "S_CF_gearwheel" of the shaft having the component position number "Sha2", the aforesaid cylinder surface being given by the cylindrical contact surface of the shaft with the gear wheel.

In the case of a pattern rule, according to one embodiment of the invention "designation2" names the designation of a pattern which is defined in the design drawing of each component of the modular system that is assignable to the component position number under "SN2. The entry under "designation1" may remain free.

For example, pattern rule 109 (designated by row 109) in FIG. 4A of the knowledge base data structure 130 describes that the screw having component position number "Scr1" should be patterned according to the pattern having the designation "screw-connection pattern" in the flange having component position number "Fla1". Referring to FIG. 6B, a screenshot of a CAD standard software is depicted which illustrates this pattern. Output feature 601, a screw, is patterned there. In the left window, a pattern list 604 can be seen, which describes a derived circle pattern. Pattern features 602 are formed from copies of the screw being inserted at the free edges of a hexagon determined beforehand. Accordingly, six screws "050" are specified by component position number "Scr1" in purchase-order parts list 102.

According to one embodiment of the invention the knowledge-based data structure 103 contains further information with respect to each rule. For example, in column "SP" it is designated at which shaft position the rule is to be used. The designation is implemented in the manner described above. A single zero means that the rule is to be used for all shaft positions.

The column "Config." indicates which design drawing representation form should be selected. Possible values here are "Standard" or "Details" or "reduced", in the latter case, for example, a gearwheel being represented as a cylinder without teeth. Further possible designations for values of this column are freely selectable in further refinements.

The column "Alignment", indicates whether the linkage is used for the final fixation of the components (e.g., value of the column is "compulsory") or whether a pre-positioning is carried out (e.g., the value of the column is "position"). The advantage of using pre-positioning is that ambiguities are avoidable. Therefore, the column "alignment" offers place for a binary-valued attribute, which is usable for the order of the rules when generating a design drawing of the design variant. For example, the parallel alignment of two axes, which are perpendicular to each other, is ambiguous with respect to the relative orientation. A preliminary orientation of the second axis toward a third, and a subsequent orientation of the second axis toward the first can possibly eliminate this ambiguity.

The column "Remarks" is used for remarks. Such remarks may involve information which is to appear in a CAD drawing or 3D model of the design variant in question, or comments concerning documentation, or parameters that are reserved for expansions of the system.

The column "Active" is provided in which the logic values "true" or "false" may be placed for activating or de-activating individual rules. Thus, maintenance of knowledge-base data structure 103 is able to be performed through use of this column. For example, if the rule is not active, the rule may be removed from the knowledge base data structure 103 according to one embodiment of the invention.

FIG. 9 shows an alternative example for a knowledge-base data structure according to one embodiment of the invention. In FIG. 9, numeric strings are used for designating the component position numbers, and columns are provided for four further parameters. In columns "Designation1" and "Designation2", geometrical auxiliary figures are filed with type (e.g., "A" for axis, "S" for surface, "P" for plane) and designation. In the column "Linkage/Pattern", linkages or patterns are indicated with type (e.g., "L" for linkage and "P" for pattern) and linkage instruction. At least the standard linkage instructions listed above are usable as linkage instructions. Therefore the rules having the numbers 2, 8, 9, 10, 11 and 12 describe the linkage of, in each instance, two axes. As another example, rule number 15 describes the patterns of screws. Since these screws are not dependent on the arrangement of the input or output shaft, a "0" is entered for rule number 15 at shaft position. Thus, the rule is to be used for all shaft positions. A mix-up of this entry with the designation shaft position "0" according to FIG. 8 is avoidable, for instance, by taking into account the fact that the specification of an input shaft always requires the specification of an output shaft, as well. Therefore, an entry made up of a numeral represents a special case.

Figure 10:
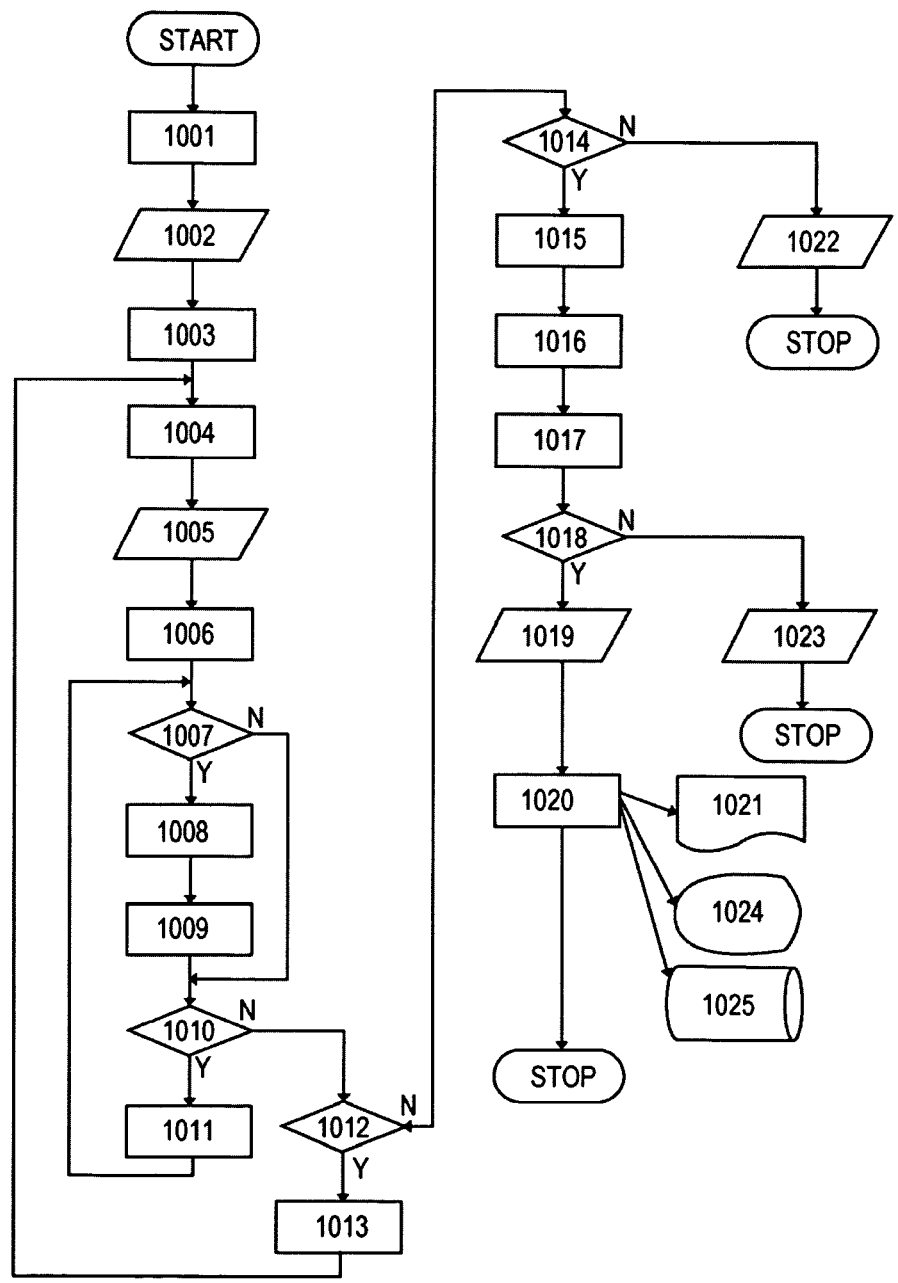
FIG. 10 is an exemplary flow diagram for an assembly module according to one embodiment of the invention.

FIG. 10 is an exemplary flow diagram to generate the design drawing performed by the assembly module 105 according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams and the embodiments of the invention discussed with reference these other diagrams can perform operations different than those discussed with reference to the flow diagrams.

At an operation 1001, a structure list 1002 is generated from the purchase-order parts list 102. To that end, a data structure (e.g., a table, list, etc.) is created in which each component position number of purchase-order parts list 102 that designates a design drawing part (e.g., CAD part, 3D model part) is written into a new line. The resulting structure list 1002, for example, from FIG. 2A, is shown in FIG. 11. As shown, in addition to the component position number, the item number, the flag "part subject to wear" and the quantity from purchase-order parts list 102 are copied in each line; and a counter "Priority", a flag "found in knowledge base and parts list", a flag "PLM document found", each with the starting value 0, and three further columns are set up. The counter is used for the later sorting of the entries in structure list 1002, the flags are used to monitor for and to find errors.

As shown in FIG. 10, structure list 1002 is further processed. In an operation 1003, the component position number of the topmost entry in the structure list is selected (in the purchase-order parts list 102 from FIG. 2A, this is "Hou" (housing)). Subsequently in operation 1004, a sublist 1005 is created in which all the rules from knowledge-base data structure 103 are entered for which the first component position number of the rule (e.g., the component position number entered in knowledge-base data structure 103 in the rule in question tinder SN1) is the selected component position number. According to one embodiment of the invention, the knowledge-base data structure 103 is implemented as an SQL database and has an SQL interface, via which assembly module 105 transmits search queries and receives search results. For example, this sublist 1005 for the component position number "Hou" in accordance with the knowledge-base data structure according to FIGS. 4A-B is not made up of any element, while a corresponding sublist for "Scr1" contains rules 108, 109 and 110.

This sublist 1005 is further processed. In an operation 1006, the topmost entry of sublist 1005 is selected. In an operation 1007, it is determined whether the second component position number of the selected rule is included in the structure list 1002. For each line entry of structure list 1002, it is determined whether its component position number agrees with the second component position number considered at the moment. If the answer is positive (Y), then the rule is relevant for the present design variant, and in an operation 1008, the number of the rule is noted in structure list 1002 in the column "Linkages" for the component position number selected, and in operation 1009, the counter "Priority" is incremented with respect to the second component position number of the present rule, and the flags "found in knowledge base and parts list" are set for both component position numbers. Alternatively, according to one embodiment of the invention the rules with respect to a component are stored in an array, and a pointer to the array in question is noted under "Linkages". Pattern instructions found are also entered under "linkages" or in the mentioned array. If the answer to query 1007 is negative (N), the algorithm continues directly with operation 1010.

In operation 1010 it is determined whether further rules are present in sublist 1005. If this is the case (Y), then in a next operation 1011, the next-following rule is selected from sublist 1005, and the algorithm is continued with operation 1007. If the answer to operation 1010 is negative (N), then sublist 1005 is completely evaluated and the algorithm continues with operation 1012.

In operation 1012, it is determined whether further entries are present in structure list 1002. If this is the case (Y), then in a next operation 1013, the next-following component position number in structure list 1002 is selected, and the algorithm is continued with operation 1004. If the answer to operation 1012 is negative (N), then the structure list 1002 is completely evaluated and the algorithm continues with operation 1014.

At the point of operation 1014, the structure list with respect to purchase-order parts list 102 according to FIG. 2A includes the information indicated in FIG. 12. In operation 1014, it is determined whether the flag "found in knowledge base and parts list" is set for each component position number in the structure list. If this is not the case, then in operation 1022, an error message about a faulty knowledge-base data structure is output, and the algorithm terminates.

If the response to operation 1014 is positive (Y), then in operation 1015, the noted linkages are put in order for each component position number of the structure list 1002. In so doing, rules having the value "position" should be first under "alignment", rules which link surfaces, planes or edges should be in second place, rules which link axes in third place, and rules which describe pattern instructions in fourth place. Within rules equal in rank, the arrangement is carried out according to ascending rule number. This order stipulation results from the special features of design drawing program 111 used in processing linkages. For example, if the alignment of axes more likely leads to uncertainties than the alignment of planes, then in sorting the linkages in structure list 1002, a priority should be given to the planes before the axes. In the same way, advantageously the sequence of line entries equal in rank is controllable among themselves by an order system in the component position-number catalog 300.

In operation 1016, the structure list is put in order according to descending counter value in the column "Priority". Within entries equal in rank, the arrangement in the list of the component position numbers, as stored in the table in FIG. 3 or in configuration data structure 114, decides the order. Therefore, in the example according to FIG. 12, the topmost entry which relates to the housing stays as it is. Alternatively, in one embodiment of the invention this is also already readable in FIG. 2B, since edges end at the housing, but no edges go out from the housing. However, the linkages of the knowledge-base data structure do not absolutely coincide with the graph according to FIG. 2B. For example, it may be advantageous to orient a shaft in the axial direction toward a bearing, but to fix the shaft axis concentrically in the borehole of the housing.

In operation 1017 in FIG. 10, for each component position number, the design drawing component of the associated item number is sought in metadata base 112. If the design drawing component is present, its C_ID number is entered in structure list 1002, and the flag "PLM document found" is set there.

In operation 1018, it is determined whether all flags "PLM document found" are set. If this is not the case (N), the algorithm terminates after a corresponding error message 1023. If the answer to operation 1018 is positive (Y), then all necessary data is held ready for generating the assembly drawing of the design variant.

In operation 1019, structure list 1002, now finished being filled and ordered, is available as shown for the example considered in FIG. 13. In operation 1020, the entries of structure list 1002 are evaluated with the aid of an additional program, for making a design drawing (113, 1021, 1024, 1025) of the design variant. This additional program is integrated as a representation module 115 in assembly module 105, and is described below in connection with FIG. 14. In alternative embodiments of the invention, the representation module 115 is separate and apart from the assembly module 105. In particular, the design drawings of the components entered in structure list 1002 are loaded by the representation module 115 into the design drawing program 111, and are linked or patterned in the indicated sequence with the aid of the noted and sorted rules. The design drawing program 111 generates a design drawing for the design variant, under direction of the representation module 115.

Figure 6A:
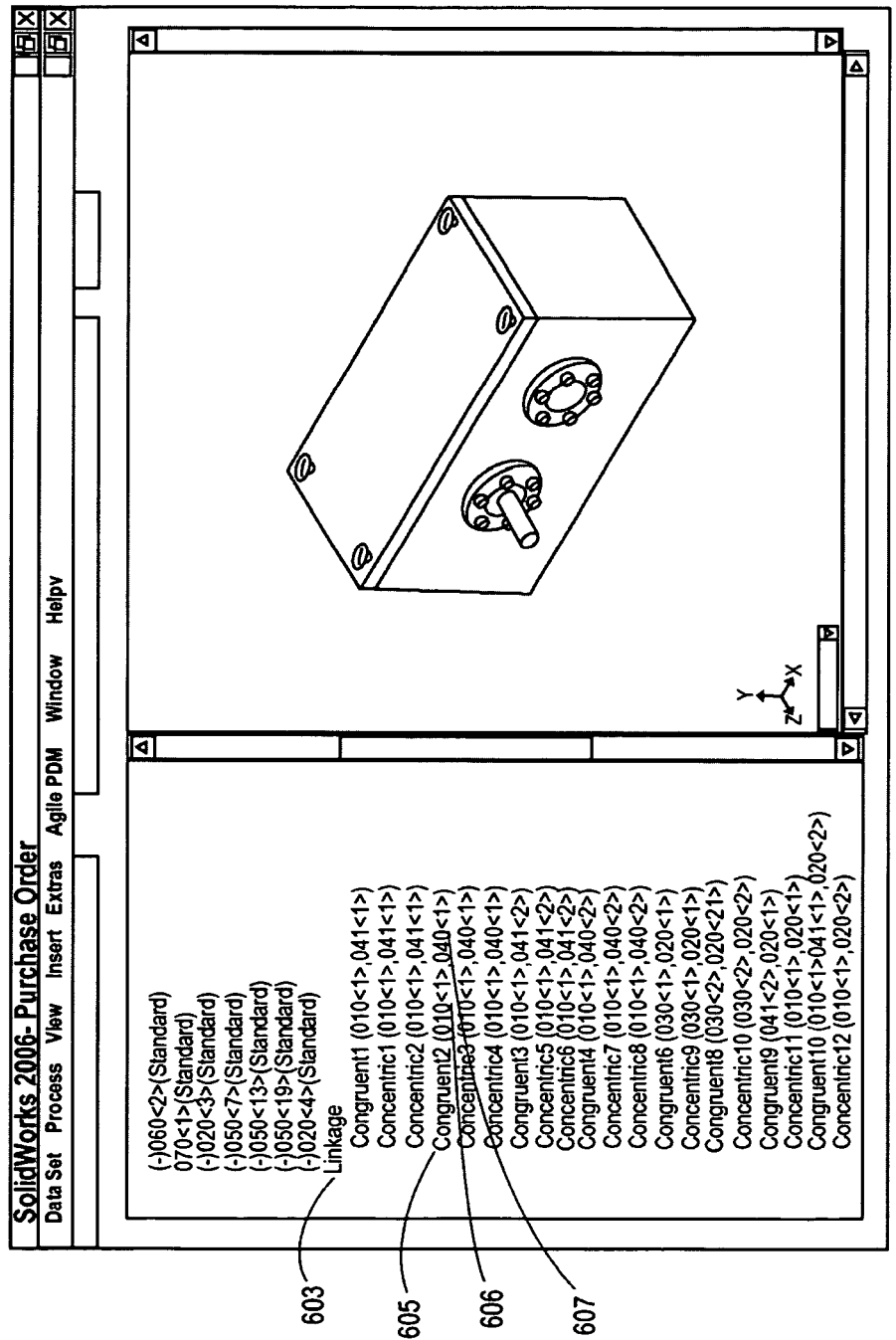
FIG. 6A are exemplary ascertained linkages for the design variant of FIG. 2A and FIG. 2B according to one embodiment of the invention.
Figure 6B:
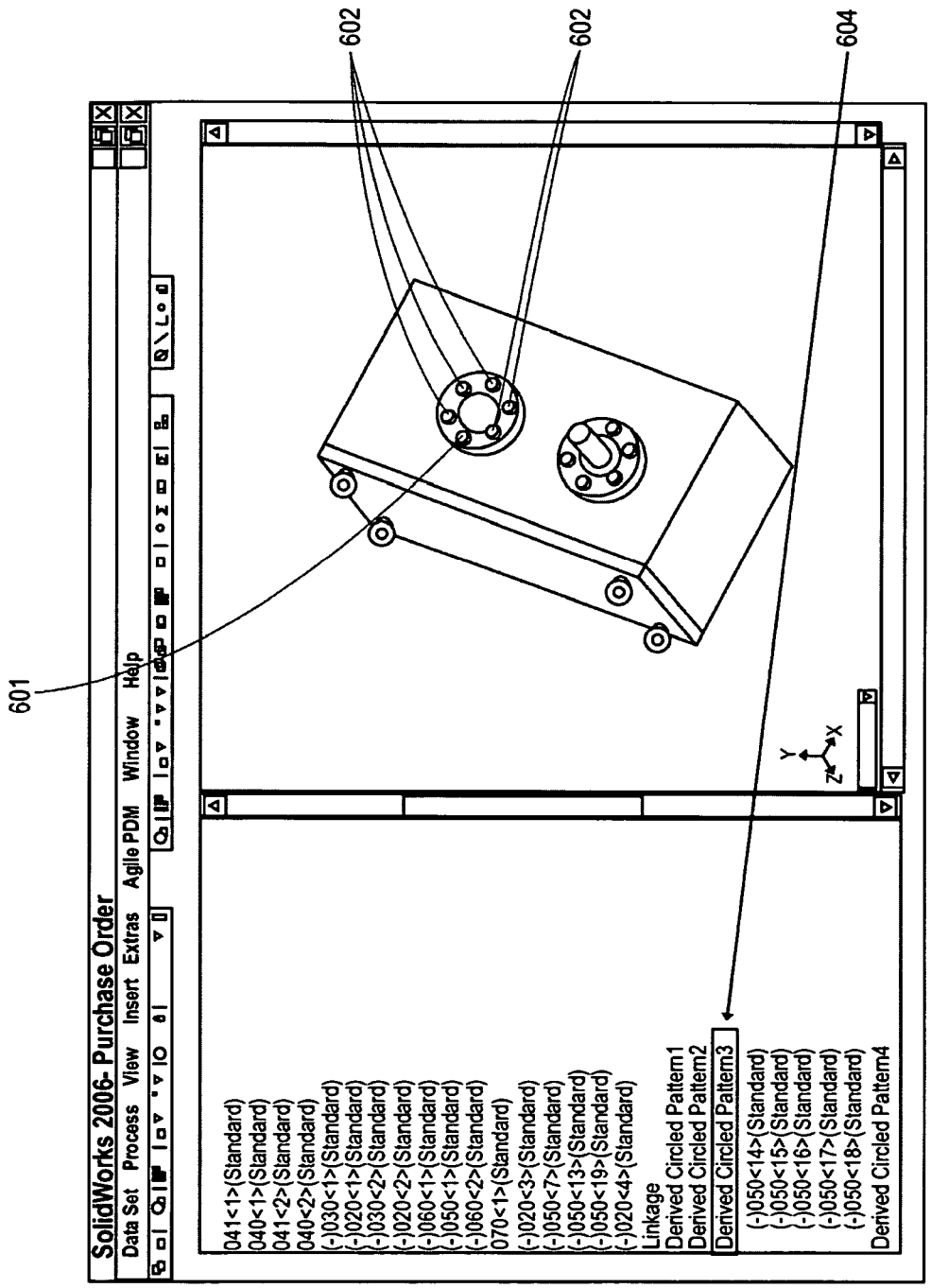
FIG. 6B are exemplary ascertained pattern instructions for the design variant of FIG. 2A and FIG. 2B according to one embodiment of the invention.

FIGS. 6A and 6B show an example of a view of a finished design drawing in the design drawing program 111 in the form of a screenshot. In the left window of the display, the linkages are indicated as linkage list 603 in typical form in FIG. 6A, and the pattern instructions are indicated in the form of a pattern list 604 in FIG. 6B. The linkage list 603 and the linkage instruction 605, which may be standard linkage instructions as described above, are in each case indicated with a first linked component 606 and a second linked component 607. Thus, in the designated linkage, housing "010" and the flange for the shaft opening in the case of shaft position 4 "040" are aligned congruently with respect to an auxiliary figure (see FIG. 2A and FIG. 3).

At the left edge and at the upper edge of FIGS. 6A and 6B, toolbars are shown, with which standard functions of the design drawing program can be applied to the design drawing. By use of the design drawing program, which in alternative exemplary embodiments of the invention also takes the form of design drawing viewers (e.g., software package eDrawings), advantageously the entire functionality of the design drawing program is available for further processing of the generated design drawing. Thus, embodiments of the invention are able to be linked to the functional abundance of design drawing program solutions. Thus, design drawings are able to be further processed by the design drawing program. Additional functions may also be provided through use of the design drawing program (e.g., the representation or especially identification of parts subject to wear).

Figure 5:
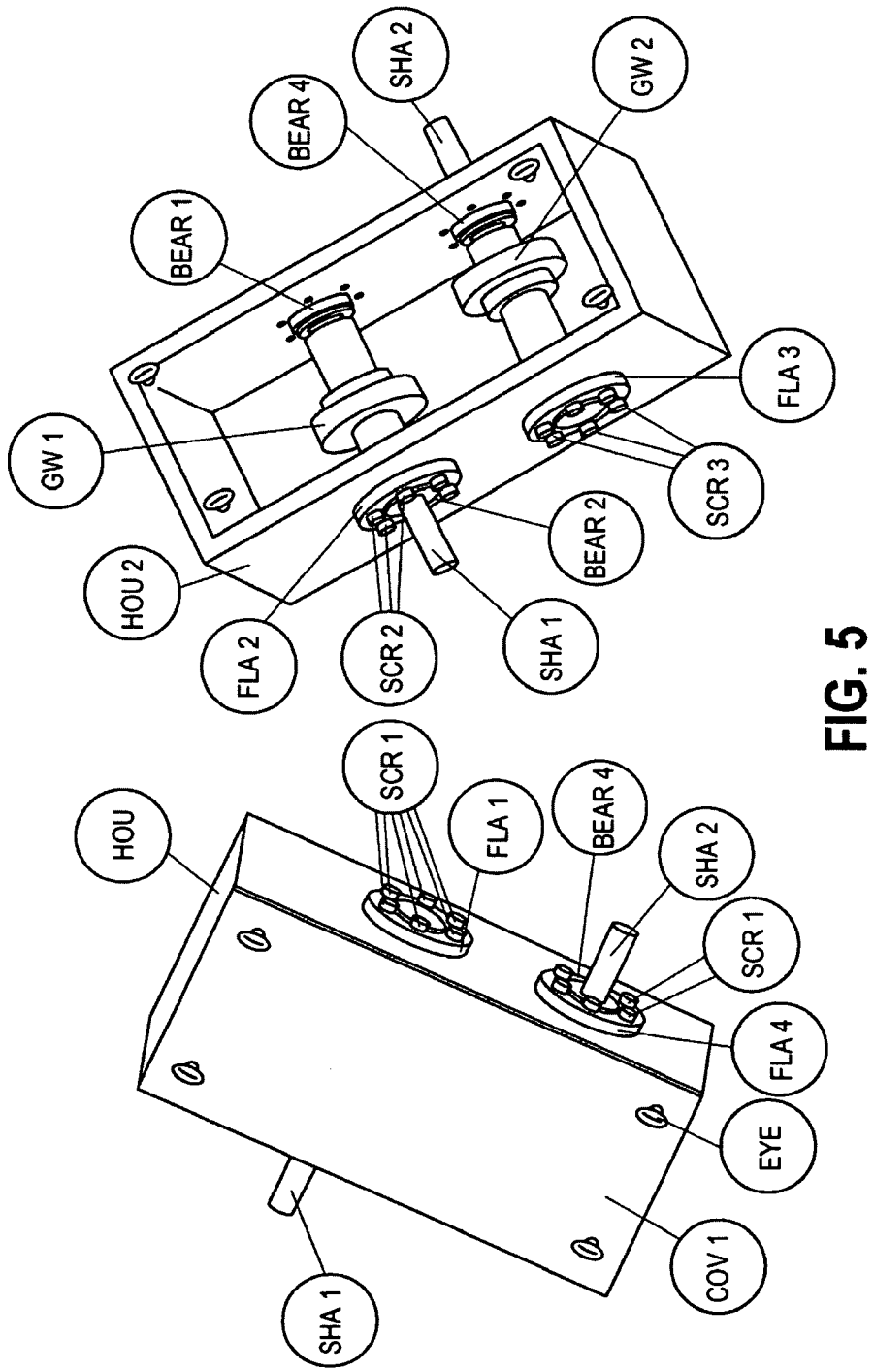
FIG. 5 is an exemplary generated design variant drawing having component position numbers with respect to the parts list from FIGS. 2A-B and with respect to the knowledge base data structure of FIGS. 4A-B according to one embodiment of the invention.

FIG. 5 shows the output of the prepared design drawing as a 3D drawing having component position numbers 501. In the upper depiction in FIG. 5, cover 502 was masked out in order to make the interior of the gear unit visible.

After preparation of the design drawing and the output of representations (derived on paper 1021, on a monitor 1024, or the storage of the design drawing on a storage medium 1025), the algorithm terminates. Further views (e.g., exploded views, sectional views, detail views, etc.) are derivable from the design drawing using the design drawing program 111. To derive sectional views, planes to which the desired sectional views can be related may be defined on housing parts or other components.

Figure 14:
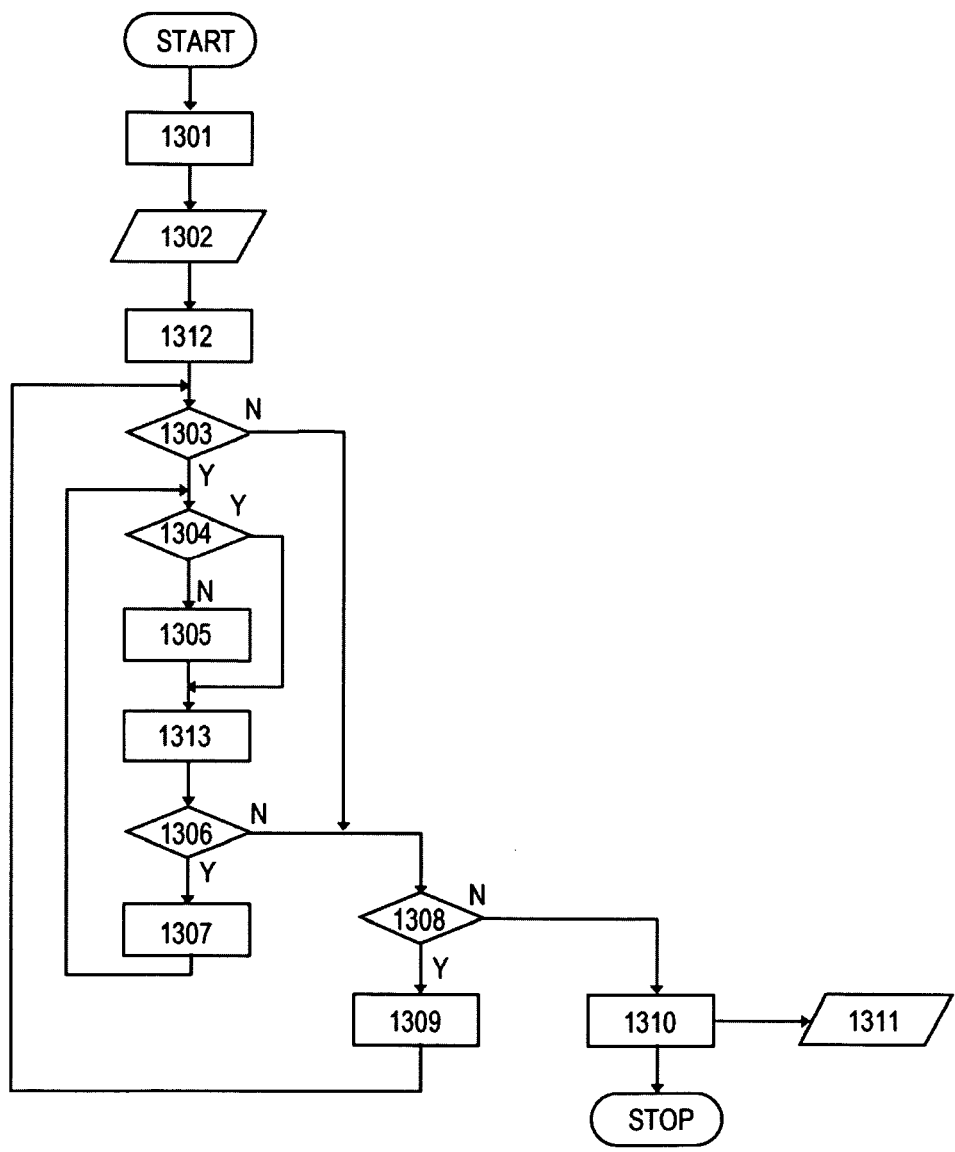
FIG. 14 is an exemplary flow diagram for a representation module according to one embodiment of the invention.

FIG. 14 is an exemplary flow diagram undertaken by a representation module 115 according to one embodiment of the invention. In operation 1301, the representation module 115 accesses interface 110, which thereupon loads the design drawing data necessary for the design drawing component, from metadata base 112 into the design drawing program 111. In operation 1302, the representation module 115 gives the design drawing program 111 the instruction to create an assembly group. The design drawing program 111 is able to calculate and generate the assembly drawing and/or 3D model. Thus, by using standard design drawing program, ease and flexibility of operation is thus increased. The use of standard design drawing programs has the further advantage that an extensive, loadable functionality is available for further processing of the design drawing.

In operation 1312, the representation module 115 gives the design drawing program 111 the instruction to insert the topmost component in sorted structure list 1002 into the assembly group. In operation 1303, the representation module 115 determines whether a linkage for the component is entered in the structure list 1002. If this is not the case (N), the representation module 115 continues with the processing of operation 1308. Otherwise (Y), the representation module 115 checks whether the second component involved in the linkage is already inserted into the assembly group in operation 1304.

If this is not the case (N), in operation 1305, the representation module 115 gives the design drawing program 111 the instruction to insert the second component involved in the linkage into the assembly group. Otherwise (Y), the algorithm continues directly with operation 1313.

In operation 1313, the representation module 115 gives design drawing program 111 the instructions to select the geometrical auxiliary figures entered in the respective linkage of the components concerned, and to execute the noted linkage or possibly the pattern instruction. Thus, the components concerned are aligned or fixed with respect to the degree of freedom limited by the respective rule.

In operation 1306, the representation module 115 determines whether further rules for the first component are entered in structure list 1002. If this is the case (Y), the next rule is selected, and the algorithm is continued with operation 1304. Otherwise (N), the algorithm is continued with operation 1308.

In operation 1308, the linkages for the first component specified topmost in structure list 1002 are processed. In operation 1308, the representation module 115 determines whether further components are specified in the structure list. If this is the case (Y), the next component is selected, and the algorithm is continued with operation 1303. Otherwise (N), all components are processed, and the flow continues with operation 1310. In operation 1310, all linkages of all components are processed, and a finished calculated design drawing component 1311 is output. According to one embodiment of the invention this output takes place via a monitor or via other suitable display means. The calculated design drawing component 1311 is stored in metadata base 112. After the design drawing component 1311 is generated, the representation module 115 terminates.

The present invention is not limited to the data formats and scopes of data disclosed in the description and in the figures. Alternative forms for the arrangement of the columns and lines, or, e.g., the arrangement in lists are possible, and the information content is expandable by including additional information in each line of the table (e.g., each row in the data structure). In the same way, the data structures shown may be united to form an overall matrix, or are subdividable into subtables.

Something similar holds true for the description of the storage and transmission of data. The present invention is not restricted to the forms specifically described. They were merely selected to make the presentation clearer and simpler. Thus, in particular, the invention with respect to the storage of the contents of the figures is not restricted to the formatting, arrangement or coding used in these figures.

It should be understood that the component position numbers are used as placeholders for the specific components which, on their part, are denoted by the item number. In this context, the components which are able to be assigned to a component position number must have matching features. At least for the component, these matching features are typical geometrical auxiliary figures (e.g., surfaces, planes, axes, cylinders, lines, circles, edges, etc.) which must be defined in the design drawings of the components in question. For example, in the case of a screw, such auxiliary figures may be the axis of the screw, and in the screwed-in state, the area of the screw head touching the receiving part, or the envelope contour of the thread and the aforesaid area. The defined auxiliary figures are used to establish the spatial position of the component. In the case of symmetrical components, this does not have to be completely established. Advantageously, these features are useable for forming classes of components. The classification relates in to the features (e.g., the geometrical auxiliary figures) which are formed in the case of the components of the corresponding class.

The components are therefore objects whose features in particular are the geometrical auxiliary figures mentioned. In this respect, the component position numbers are object classes. The component position numbers advantageously assume the tasks associated with position numbers in technical drawings, particularly the identification of the components of a design variant or an assembly group in a technical drawing. The component position numbers expand the task of conventional position numbers to the effect that in different design variants, components having the same function (e.g., the bearing of a shaft in a specific shaft position or a screw for the maintenance cover of the gear unit) are denoted by the same component position number (i.e., are assigned to the same component position number).

FIG. 15 illustrates an exemplary computing system (e.g., a computer) according to one embodiment of the invention. The exemplary computing system of FIG. 15 includes: 1) one or more processors 1501; 2) a memory control hub (MCH) 1502; 3) a system memory 1503 (of which different types exist such as DDR RAM, EDO RAM, etc.); 4) a cache 1504; 5) an I/O control hub (ICH) 1505; 6) a graphics processor 1506; 7) a display/screen 1507 (of which different types exist such as Cathode Ray Tube (CRT), Thin Film Transistor (TFT), Liquid Crystal Display (LCD), DPL, etc.; and/or 8) one or more I/O devices 1508.

The one or more processors 1501 execute instructions in order to perform whatever software routines the computing system implements. The instructions frequently involve some sort of operation performed upon data. Both data and instructions are stored in system memory 1503 and cache 1504. Cache 1504 is typically designed to have shorter latency times than system memory 1503. For example, cache 1504 might be integrated onto the same silicon chip(s) as the processor(s) and/or constructed with faster SRAM cells whilst system memory 1503 might be constructed with slower DRAM cells. By tending to store more frequently used instructions and data in the cache 1504 as opposed to the system memory 1503, the overall performance efficiency of the computing system improves.

System memory 1503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1503 prior to their being operated upon by the one or more processor(s) 1501 in the implementation of a software program. Similarly, data that a software program determines should be sent from the computing system to an outside entity through one of the computing system interfaces, or stored into an internal storage element, is often temporarily queued in system memory 1503 prior to its being transmitted or stored.

The ICH 1505 is responsible for ensuring that such data is properly passed between the system memory 1503 and its appropriate corresponding computing system interface (and internal storage device if the computing system is so designed). The MCH 1502 is responsible for managing the various contending requests for system memory 1503 access amongst the processor(s) 1501, interfaces and internal storage elements that may proximately arise in time with respect to one another.

One or more I/O devices 1508 are also implemented in a typical computing system. I/O devices generally are responsible for transferring data to and/or from the computing system (e.g., a networking adapter); or, for large scale non-volatile storage within the computing system (e.g., hard disk drive). ICH 1505 has bi-directional point-to-point links between itself and the observed I/O devices 1508.

While in one embodiment of the invention the computing device 100 belongs to a user or entity that desires to create the design drawings of design variants of a production series, in an alternative embodiment of the invention the computing device 100 belongs to a service provider that is providing access to the automatic generation of design drawings of design variants of a production series. For example, a customer of the service provider (e.g., a person or entity that wishes to generate a design drawing of a design variant of a production series) may input parameters according to their desired design variant into the computing device 100. For example, a web interface (e.g., either part of the computing device 100 or a separate computing device) may be provided such that the customer, for a particular modular system (e.g., a gear unit), may select which components are to be used to create their own design variant of the modular system. The computing device 100 receives these selections (e.g., directly or indirectly from the web interface) and automatically generates the design drawing. The assembled design drawing may then be delivered to the customer (e.g., through the web interface, email, DVD, CD, paper, etc.).

According to one embodiment of the invention, the computing device 100 has access to a set of one or more predefined modular systems that each has one or more associated selectable components. The data reflecting the predefined modular system may be stored in the computing device 100 or on another computing device or storage device coupled with the computing device 100. In addition, the associated selectable components for each modular system may be stored in the computing device 100 or another computing device or storage device coupled with the computing device 100. The selectable components may be design drawings of the possible components for the associated modular system. For example, in the case of a gear unit modular system that is accessible by the computing device 100, one or more selectable components of the gear unit may selected by the customer.

In order to generate the design drawing, the customer selects the modular system for which it wants to generate a design variant design drawing. For example, the possible modular systems that are accessible on the computing device 100 may be included on a web interface (e.g., a web site). The customer may select the modular system through use of the web interface (e.g., through a standard web browser). After this selection, the computing device 100 provides the selectable components of the selected modular system to the customer. The customer may then select the components for their design variant and the computing device 100 automatically generates the design drawing according to the selected components of the selected modular system (e.g., through use of the components illustrated in FIG. 1 and the operations of the flow diagrams of FIG. 10 and FIG. 14). The assembled design drawing may then be delivered to the customer (e.g., through the web interface, email. DVD, CD, paper, etc.). Alternatively or additionally, the assembled design drawing is stored on the computing device 100 and is accessible and viewable by the customer through the web interface.

The computing device 100 may not have access to the particular modular system the customer desires. According to one embodiment of the invention the customer may define the modular system and transmit the data regarding the modular system to the computing device 100 (e.g., through a web interface). In addition, the customer may transmit the possible components for the modular system, and the rules for the design variant. The customer may also selectively choose whether the transmitted modular system is available publicly to other customers or is private to that customer.

It should be understood that embodiments of the invention are not limited to the terms used. The terms are used to clarify the hierarchy in which the data of the modular system is organized. Other systems of terms are therefore usable for describing the invention. For example, an alternative term for component position number is serial number.

The modules of the computing device 100 may include software, hardware, firmware, or any combination thereof. For example, the modules may be software programs available to the public or special or general purpose processors running proprietary or public software. The software may also be specialized programs written specifically for generating design drawings of design variants of production series.

An advantage of the present invention is, inter alia, that to the greatest extent possible, all work steps are processed consistently with the minimal data volume needed in each case, by considering object classes instead of the objects having features.

In alternative embodiments of the invention, instead of geometrical auxiliary figures, other data is used as features that are usable for determining the relative spatial arrangement of two components.

In further embodiments of the invention, with the aid of assembly module 105, further design drawing types are able to be generated (e.g., exploded drawings, drawings having parts subject to wear marked in color, two-dimensional projections, sectional views, partial views, representations of assembly groups, or functional models which simulate the movement of the movable components).

In another exemplary embodiment of the invention, mounting instructions are generated based on the sequence of linkages. To that end, the rules in knowledge-base data structure 103 are put in suitable order, and the component position numbers are defined accordingly. In particular, the circumstance is avoided that in a graph as in FIG. 2b, a directed edge is pointing to an inaccessible component. Thus, the order is such that a graph as in FIG. 2b reproduces the mounting sequence from inside to outside, thus opposite to the directed edges.

Advantageously, a 3D CAD system like SolidWorks or Inventor may be used as the design drawing program. However, other design drawing programs may advantageously be used, as well.

While embodiments of the invention have been described in relation to a design variant of a gear unit, other design variants of different modular systems may be drawn. For example, other exemplary modular systems include electric motors, automobiles, automobile components, semitrailers, means of transport, furniture, switchgear cabinets, shelf systems, kitchen systems, manufacturing facilities, or other products that are assembled from components. Therefore, it should be understood that embodiments of the invention are not limited to gear units.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computing device to generate design drawings for design variants that are assembled from components of a modular system, comprising:
a memory storing
a first data structure to store the components of the modular system, wherein each component includes a quantity of features, and wherein design variants of the modular system include different types of the same components, different numbers of components, different placement of components, different combinations of components, or different components;
a second data structure to store component position numbers, wherein each of a plurality of the component position numbers identifies a first component of the first data structure and defines a use of the first component with a second component of the first data structure, the second component also identified by a component position number, wherein at least one component is assignable to each of the component position numbers, and each design variant is describable by assignment of the components of the modular system of the first data structure to component position numbers of the second data structure; and
a third data structure to store one or more rules, wherein each rule is to set each of the first and second components of the component position numbers in a spatial relationship, and wherein at least one spatial relationship is selected from a group consisting of the following: congruent, parallel, perpendicular, tangential, concentric, at a distance, at an angle, aligned, or counter-aligned;
a configurator to provide selectable components having component position numbers and being associated with the modular system, the configurator to further receive selection of components from the provided selectable components for a design variant; and
an assembly module to automatically, in response to receiving the selection of the components for the design variant of the modular system, cause the computing device to select the rules from the third data structure that correspond to the component position numbers for the selected components, assemble the components to form a design drawing of the design variant according to relationships defined by the component numbers and the spatial relationships defined in the selected rules, and to cause a design drawing of the assembled design variant to be displayed according to the selected rules.

2. The computing device of claim 1, wherein the features for each component that are to be stored in the first data structure include information concerning geometrical auxiliary figures in a design drawing of this component for the spatial alignment of the component.

3. The computing device of claim 1, further comprising:
a man-machine interface to assign component position numbers from the second data structure to form a parts list for the design variant, wherein the man-machine interface includes means for accessing data in the second data structure.

4. The computing device of claim 1, wherein at least one design drawing is to be stored in the first data structure for each component of the modular system.

5. The computing device of claim 1, wherein the first data structure and the second data structure are encompassed by one data structure.

6. The computing device of claim 1, further comprising:
a means for processing a design drawing.

7. The computing device of claim 1, further comprising:
a data interface to transfer to a design drawing program design drawing data from the first data structure and design drawing instructions; and
wherein the assembly module includes means to control the design drawing program.

8. A computer-implemented method for generating a design drawing for a design variant, comprising:
receiving, by a computing device, user configuration of the design variant including providing selectable components associated with a modular system, and receiving selection of components from the provided selectable components to generate a parts list for a design variant, wherein design variants of the modular system include different types of the same components, different numbers of components, different placement of components, different combinations of components, or different components, and wherein the selection of the components includes selecting component position numbers for each selected component, each of a plurality of the component position numbers identifying a first component and defining a use of the first component with a second component, the second component also identified by a component position number;
automatically selecting rules for the selected components in response to receiving the selection of the components, wherein each rule is selected by the computing device if the rule sets a spatial relationship between components of the selected component position numbers, and wherein at least one spatial relationship is selected from a group consisting of the following: congruent, parallel, perpendicular, tangential, concentric, at a distance, at an angle, aligned, or counter-aligned;
storing the configured design variant including the selected rules in a data structure; and
drawing, by the computing device, one or more design drawings of one or more components provided in the design variant, and assembling the components to form a design drawing of the design variant according to relationships defined by the component numbers and the spatial relationships defined in the selected rules.

9. The computer-implemented method of claim 8, wherein the computing device assembles the components with use of a standard design drawing package, and wherein the standard design drawing package illustrates the design drawing of the design variant.

10. A computer-implemented method for generating a design drawing for a design variant of a production series comprising:
providing, by a computer, selectable components associated with a production series;
receiving, by the computer, selection of components from the provided selectable components to be included in the design variant, wherein design variants of the production series include different types of the same components, different numbers of components, different placement of components, different combinations of components, or different components;
accessing, by the computer in response to the selection of components, design drawings stored in a first data structure according to the design variant, wherein each of the accessed design drawings represents a selected component of a modular system, and wherein each component includes a quantity of features;

automatically accessing, by the computer in response to the selection of components, object classes for each selected component stored in a second data structure, wherein each object class includes a quantity of features, wherein at least one component is assignable to each object class, wherein each of a plurality of object classes identifies a first selected component and defines a use of the first selected component with a second selected component, the second selected component also identified by an object class, and wherein the quantity of features of each object class is a portion of the quantity of features of each component;

accessing, by the computer in response to the selection of components, one or more rules stored in a third data structure, wherein each rule defines a spatial relationship between components of the object classes of the selected components, and wherein at least one spatial relationship is selected from a group consisting of the following: congruent, parallel, perpendicular, tangential, concentric, at a distance, at an angle, aligned, or counter-aligned;

automatically selecting, by the computer from the third data structure, one or more rules for the accessed object classes in response to the selection of the components, wherein each rule is selected by the computer if the rule sets a spatial relationship between selected components of the object classes, and wherein at least one spatial relationship is selected from a group consisting of the following: congruent, parallel, perpendicular, tangential, concentric, at a distance, at an angle, aligned, or counter-aligned;

generating, by the computer, a design drawing of the assembled design variant based on the accessed object classes, rules, and design drawings of the selected components; and displaying, by the computer, the generated design drawing on a display.

11. The computer-implemented method of claim 10, wherein for each rule, the two object classes which are related by the rule are stored as a first and a second entry for that rule in the third data structure.

12. The computer-implemented method of claim 10, wherein the design variant is configured by a configurator, wherein the configurator accesses the second data structure, and wherein the design variant is defined by a parts list generated in response to the selection of components.

13. The computer-implemented method of claim 10, wherein the design variant is represented by a graph, wherein nodes of the graph represent the components used in the design variant and edges of the graph represent physical connections between the components, and further comprising using a system of rules from the third data structure to translate each edge of the graph into a succession of linkage instructions for a design drawing package.

14. The computer-implemented method of claim 10 wherein the features for each component stored in the first data structure include information concerning geometrical auxiliary figures in a design drawing of this component for the spatial alignment of the component, and wherein the rules describe linkages between the geometrical auxiliary figures of the features.

15. The computer-implemented method of claim 14, wherein the linkages of the rules correspond to linkage instructions as used in a design drawing package and the linkages of the rules correspond to sequences of pattern instructions as used in the design drawing package, and wherein the linkages include congruent, parallel, perpendicular, tangential, concentric, at a distance, at an angle and/or counter-aligned/aligned.

16. The computer-implemented method of claim 10, wherein a design drawing, in which the object classes for the components are represented as position numbers, is derived from the 3D model of the design variant, and wherein at least one of the data structures is a SQL (Structured Query Language) database.

17. The computer-implemented method of claim 10, wherein the design variant production series is one of a gear unit, electric motor, automobile, automobile component, semitrailer, means of transport, furniture, switchgear cabinets, shelf systems, kitchen systems, or manufacturing facilities.

18. The computer-implemented method of claim 10, further comprising a user configuring the design variant by generating a parts list based upon the selected components, and wherein for each entry of the parts list ascertaining those rules whose entry includes the object class of the parts list entry and storing these rules in a sublist with respect to the parts list entry.

19. The computer-implemented method of claim 18 further comprising:
in the sublist for each parts list entry, eliminating the ascertained rules for which the object class of a second entry for the rule is not included in the parts list; and
storing the ascertained rules that are not eliminated in a structure list, and processing those rules.

20. The computer-implemented method of claim 10,
wherein the selected rules for the selected object classes are put in order that determines sequence of linkage instructions.

21. The computer-implemented method of claim 20, wherein the selected object classes and the selected components for the design variant define a directed graph, wherein edges of the directed graph represent the selected object classes, and nodes of the directed graph represent the selected component which is assigned to the object class represented by an outgoing edge.

22. The computer-implemented method of claim 20, wherein a design drawing package is used for generating the design drawing, and further comprising:
sorting the selected rules and translating the sorted rules into standard commands of the design drawing package, wherein sorting includes an order relation in a quantity of usable linkages, wherein the order relation is to put the selected rules for the selected object class in order.

23. The computer-implemented method of claim 22, wherein the order relation in the quantity of usable linkages arranges surface linkages, plane linkages, and/or edge linkages before axis linkages, and axis linkages before pattern instructions.

24. The computer-implemented method of claim 20 further comprising ascertaining a base object class by counting the rules for each selected object class which set a further selected object class in relation with the object class, and selecting the object class having the greatest such number.

25. The computer-implemented method of claim 20 wherein each rule in the third data structure is given a binary-valued attribute, and the selected rules are put in order according to the value of this attribute.

26. A non-transitory machine-readable medium that provides instructions that, if executed by a processor, will cause said processor to perform operations for generating a design drawing for a design variant, comprising:

providing selectable components associated with a modular system;

receiving selection of components from the provided selectable components to generate a parts list for a design variant, wherein design variants of the modular system include different types of the same components, different numbers of components, different placement of components, different combinations of components, or different components, and wherein the selection of the components includes selecting component position numbers for each selected component, each of a plurality of the component position numbers identifying a first component and defining use of the first component with a second component, the second component also identified by a component position number;

automatically selecting rules for the selected components in response to the selection of the components, wherein each rule is selected if the rule sets a spatial relationship between components of the selected component position numbers, wherein each rule is to set at least two selected components in a spatial relationship, and wherein at least one spatial relationship is selected from a group consisting of the following: congruent, parallel, perpendicular, tangential, concentric, at a distance, at an angle, aligned, or counter-aligned;

storing the configured design variant including the selected rules in a data structure; and drawing design drawings of one or more components provided in the design variant, and assembling the components to form a design drawing of the design variant according to relationships defined by the component numbers and the spatial relationships defined in the selected rules.

27. The machine-readable medium of claim 26, wherein the computing device assembles the components with use of a standard design drawing package, and wherein the standard design drawing package illustrates the design drawing of the design variant.

28. A non-transitory machine-readable medium that provides instructions that, if executed by a processor, will cause said processor to perform operations for generating a design drawing for a design variant of a production series, comprising:

providing, by a computer, selectable components associated with a production series;

receiving, by the computer, selection of components from the provided selectable components to be included in the design variant, wherein design variants of the production series include different types of the same components, different numbers of components, different placement of components, different combinations of components, or different components;

accessing, in response to the selection of components, design drawings stored in a first data structure according to the design variant, wherein each of the accessed design drawings represents a selected component of a modular system, and wherein each component includes a quantity of features;

automatically accessing, in response to the selection of components, object classes stored in a second data structure for each selected component, wherein each object class includes a quantity of features, wherein at least one component is assignable to each object class, wherein each of a plurality of object classes identifies a first selected component and defines a use of the first selected component with a second selected component, the second selected component also identified by an object class, and wherein the quantity of features of each object class is a portion of the quantity of features of each component;

accessing, in response to the selection of components, one or more rules stored in a third data structure, wherein each rule defines a spatial relationship between components of the object classes of the selected components, and wherein at least one spatial relationship is selected from a group consisting of the following: congruent, parallel, perpendicular, tangential, concentric, at a distance, at an angle, aligned, or counter-aligned;

automatically selecting from the third data structure one or more rules for the accessed object classes in response to the selection of the components, wherein each rule is selected if the rule sets a spatial relationship between selected components of the object classes, and wherein at least one spatial relationship is selected from a group consisting of the following: congruent, parallel, perpendicular, tangential, concentric, at a distance, at an angle, aligned, or counter-aligned;

generating a design drawing of the assembled design variant based on the accessed object classes, rules, and design drawings of the selected components; and displaying the generated design drawing on a display.

29. The machine-readable medium of claim 28, wherein for each rule, the two object classes which are related by the rule are stored as a first and a second entry for that rule in the third data structure.

30. The machine-readable medium of claim 28, wherein the design variant is configured by a configurator, wherein the configurator accesses the second data structure, and wherein the design variant is defined by a parts list generated in response to the selection of components.

31. The machine-readable medium of claim 28, wherein the design variant is represented by a graph, wherein nodes of the graph represent the components used in the design variant and edges of the graph represent physical connections between the components, and further comprising using a system of rules from the third data structure to translate each edge of the graph into a succession of linkage instructions for a design drawing package.

32. The machine-readable medium of claim 28 wherein the features for each component stored in the first data structure include information concerning geometrical auxiliary figures in a design drawing of this component for the spatial alignment of the component, and wherein the rules describe linkages between the geometrical auxiliary figures of the features.

33. The machine-readable medium of claim 32, wherein the linkages of the rules correspond to linkage instructions as used in a design drawing package and the linkages of the rules correspond to sequences of pattern instructions as used in the design drawing package, and wherein the linkages include congruent, parallel, perpendicular, tangential, concentric, at a distance, at an angle and/or counter-aligned/aligned.

34. The machine-readable medium of claim 28, wherein a design drawing, in which the object classes for the components are represented as position numbers, is derived from the 3D model of the design variant, and wherein at least one of the data structures is a SQL (Structured Query Language) database.

35. The machine-readable medium of claim 28, wherein the design variant production series is one of a gear unit, electric motor, automobile, automobile component, semi-trailer, means of transport, furniture, switchgear cabinets, shelf systems, kitchen systems, or manufacturing facilities.

36. The machine-readable medium of claim 28, further comprising a user configuring the design variant by generating a parts list based upon the selected components, and wherein for each entry of the parts list ascertaining those rules whose entry includes the object class of the parts list entry and storing these rules in a sublist with respect to the parts list entry.

37. The machine-readable medium of claim 36 further comprising:
in the sublist for each parts list entry, eliminating the ascertained rules for which the object class of a second entry for the rule is not included in the parts list; and
storing the ascertained rules that are not eliminated in a structure list, and processing those rules.

38. The machine-readable medium of claim 28, wherein the selected rules for the selected object classes are put in order that determines sequence of linkage instructions.

39. The machine-readable medium of claim 38, wherein the selected object classes and the selected components for the design variant define a directed graph, wherein edges of the directed graph represent the selected object classes, and nodes of the directed graph represent the selected component which is assigned to the object class represented by an outgoing edge.

40. The machine-readable medium of claim 38, wherein a design drawing package is used for generating the design drawing, and further comprising,
sorting the selected rules and translating the sorted rules into standard commands of the design drawing package, wherein sorting includes an order relation in a quantity of usable linkages, wherein the order relation is to put the selected rules for the selected object class in order.

41. The machine-readable medium of claim 40, wherein the order relation in the quantity of usable linkages arranges surface linkages, plane linkages, and/or edge linkages before axis linkages, and axis linkages before pattern instructions.

42. The machine-readable medium of claim 38 further comprising ascertaining a base object class by counting the rules for each selected object class which set a further selected object class in relation with the object class, and selecting the object class having the greatest such number.

43. The machine-readable medium of claim 38, wherein each rule in the third data structure is given a binary-valued attribute, and the selected rules are put in order according to the value of this attribute.

* * * * *